United States Patent
Han et al.

(10) Patent No.: US 10,956,844 B2
(45) Date of Patent: Mar. 23, 2021

(54) METHOD AND APPARATUS FOR DETERMINING VEHICLE SCHEDULING STRATEGY

(71) Applicant: ALIBABA GROUP HOLDING LIMITED, Grand Cayman (KY)

(72) Inventors: Zhe Han, Hangzhou (CN); Shiqi Jiang, Hangzhou (CN); Lei Yang, Hangzhou (CN); Feng Lin, Hangzhou (CN)

(73) Assignee: ADVANCED NEW TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/877,380

(22) Filed: May 18, 2020

(65) Prior Publication Data
US 2020/0279203 A1 Sep. 3, 2020

Related U.S. Application Data

(63) Continuation of application No. PCT/CN2020/071454, filed on Jan. 10, 2020.

(30) Foreign Application Priority Data

Apr. 29, 2019 (CN) .......................... 201910353751.4

(51) Int. Cl.
*G06Q 10/06* (2012.01)
*G08G 1/123* (2006.01)
(Continued)

(52) U.S. Cl.
CPC ....... *G06Q 10/06315* (2013.01); *G06F 16/14* (2019.01); *G06N 5/02* (2013.01);
(Continued)

(58) Field of Classification Search
CPC ....... G06Q 10/06315; G06Q 10/06375; G06Q 50/30; H04B 17/318; G06F 16/14; G06N 5/02; G07C 1/10; G08G 1/123
See application file for complete search history.

(56) References Cited

U.S. PATENT DOCUMENTS

| 8,249,256 B2* | 8/2012 | Korus ............... H04W 12/0401 380/272 |
| 8,965,411 B1* | 2/2015 | Busch-Sorensen ....... G01S 1/08 455/456.3 |

(Continued)

FOREIGN PATENT DOCUMENTS

| CN | 105306318 A | 2/2016 |
| CN | 105550789 A | 5/2016 |

(Continued)

OTHER PUBLICATIONS

Lehti, Janne et al. Bluetooth beacon enabled mobility services and opportunities in public transit. Oct. 2016. 23rd ITS World Congress, 10-14. pp. 3-10. http://livinglabbus.fi/Papers/ITSWC16Melbourne_EU-SP0654_20160630.pdf. (Year: 2016).*

(Continued)

*Primary Examiner* — George Chen
*Assistant Examiner* — Hunter A Molnar

(57) ABSTRACT

A method includes: obtaining a signal strength sequence of signals detected by a user terminal during a travel route. The detected signals are originated from signal sources disposed at different locations in the travel route, and the different location includes one or more vehicles or one or more stops. The method further includes: extracting, from the signal strength sequence, a first sequence fragment corresponding to a signal transmitted by a signal source disposed at a vehicle; determining a travel time duration of the user riding (Continued)

on the vehicle according to a signal strength value and time stamp information of the first sequence fragment.

20 Claims, 7 Drawing Sheets

(51) Int. Cl.
*H04B 17/318* (2015.01)
*G06N 5/02* (2006.01)
*G07C 1/10* (2006.01)
*G06F 16/14* (2019.01)
*G06Q 50/30* (2012.01)

(52) U.S. Cl.
CPC ....... *G06Q 10/06375* (2013.01); *G06Q 50/30* (2013.01); *G07C 1/10* (2013.01); *G08G 1/123* (2013.01); *H04B 17/318* (2015.01)

(56) References Cited

U.S. PATENT DOCUMENTS

| | | | |
|---|---|---|---|
| 9,103,671 B1 | 8/2015 | Breed et al. | |
| 9,596,666 B1 | 3/2017 | Sibenac et al. | |
| 10,163,178 B1* | 12/2018 | Sprogis | H04W 4/02 |
| 10,332,162 B1* | 6/2019 | Brock | G06Q 30/0284 |
| 10,454,597 B1* | 10/2019 | Indurkhya | H04W 64/003 |
| 2004/0039504 A1 | 2/2004 | Coffee et al. | |
| 2007/0004428 A1* | 1/2007 | Morgan | G01S 5/0205 |
| | | | 455/456.1 |
| 2007/0178911 A1* | 8/2007 | Baumeister | G01S 5/0252 |
| | | | 455/456.1 |
| 2008/0306678 A1* | 12/2008 | Miyawaki | G08G 1/127 |
| | | | 701/118 |
| 2009/0024309 A1 | 1/2009 | Crucs | |
| 2010/0197325 A1* | 8/2010 | Dredge | H04L 67/18 |
| | | | 455/456.3 |
| 2010/0268462 A1* | 10/2010 | Tebbit | G01S 5/0226 |
| | | | 701/431 |
| 2012/0209634 A1 | 8/2012 | Ling et al. | |
| 2012/0235812 A1* | 9/2012 | Maia | H04M 1/72572 |
| | | | 340/539.13 |
| 2013/0260788 A1* | 10/2013 | Bonde | H04W 4/025 |
| | | | 455/456.1 |
| 2014/0192715 A1* | 7/2014 | Tickoo | H04W 40/08 |
| | | | 370/328 |
| 2015/0235477 A1* | 8/2015 | Simkin | G07B 15/02 |
| | | | 705/417 |
| 2015/0281374 A1 | 10/2015 | Petersen et al. | |
| 2015/0350933 A1* | 12/2015 | Mannemala | H04W 76/18 |
| | | | 370/225 |
| 2016/0003949 A1* | 1/2016 | Venkataraman | G01S 1/08 |
| | | | 342/357.29 |
| 2016/0016585 A1 | 1/2016 | Park | |
| 2016/0078759 A1 | 3/2016 | Nerayoff et al. | |
| 2016/0094950 A1* | 3/2016 | Millman | G01S 5/0252 |
| | | | 455/456.1 |
| 2016/0192314 A1* | 6/2016 | Leppanen | G01S 5/0252 |
| | | | 455/456.1 |
| 2016/0226740 A1* | 8/2016 | Van Oost | H04L 43/0894 |
| 2016/0272196 A1 | 9/2016 | Hocking et al. | |
| 2016/0379141 A1* | 12/2016 | Judge | G07B 15/02 |
| | | | 705/5 |
| 2017/0147420 A1 | 5/2017 | Cawse et al. | |
| 2017/0168494 A1 | 6/2017 | Sibenac et al. | |
| 2018/0041866 A1* | 2/2018 | Doeweling | G06F 16/9535 |
| 2018/0060809 A1 | 3/2018 | Seaman et al. | |
| 2018/0068315 A1* | 3/2018 | Bergdale | G06Q 10/02 |
| 2018/0268039 A1 | 9/2018 | Gusenbauer et al. | |
| 2018/0304760 A1 | 10/2018 | Chase et al. | |
| 2019/0208492 A1* | 7/2019 | Maruta | G01S 5/14 |
| 2019/0356749 A1* | 11/2019 | Kim | H04L 67/26 |
| 2020/0098199 A1* | 3/2020 | Bullock | H04L 69/28 |
| 2020/0250896 A1* | 8/2020 | Vossoughi | H04W 4/80 |

FOREIGN PATENT DOCUMENTS

| | | | | |
|---|---|---|---|---|
| CN | 105869388 A | 8/2016 | | |
| CN | 106157673 A | 11/2016 | | |
| CN | 106448169 A | 2/2017 | | |
| CN | 106773884 A | 5/2017 | | |
| CN | 107766981 A | 3/2018 | | |
| CN | 107818411 A | 3/2018 | | |
| CN | 110188921 A | 8/2019 | | |
| WO | WO-2017138019 A1 * | 8/2017 | | G06Q 50/30 |

OTHER PUBLICATIONS

Narzt, Wolfgang, et al. Be-in/be-out with bluetooth low energy: implicit ticketing for public transportation systems. Nov. 2, 2015. 2015 IEEE 18th International Conference on Intelligent Transportation Systems. pp. 1551-1555. https://ieeexplore.ieee.org/stamp/stamp.jsp?tp=&arnumber=7313345. (Year: 2015).*
First Office Action for Chinese Application No. 201910353751.4, dated Jun. 1, 2020, 20 pages.
Second Office Action for Chinese Application No. 201910353751.4, dated Jul. 22, 2020, 24 pages.
Search Report for Chinese Application No. 201910353751.4, dated May 22, 2020.
Written opinion and International Searh Report for PCT Application No. PCT/CN2020/071454 dated Mar. 27, 2020 and made available to public on Nov. 5, 2020.

* cited by examiner

Detection signal source 200

Detection signal source 201

US 10,956,844 B2

METHOD AND APPARATUS FOR DETERMINING VEHICLE SCHEDULING STRATEGY

CROSS REFERENCE TO RELATED APPLICATIONS

This is a continuation application of International Application No. PCT/CN2020/071454, filed on Jan. 10, 2020, which claims priority to and benefits of Chinese Patent Application No. 201910353751.4 filed on Apr. 29, 2019. The contents of the above-referenced applications are incorporated herein by reference in their entirety.

TECHNICAL FIELD

The present application relates to the field of computer technologies, and in particular, to a method and an apparatus for determining a vehicle scheduling strategy.

BACKGROUND

Vehicles such as buses and subway trains proliferate in cities with the development of vehicle technologies and progressive city planning. As vehicles grow in number, how to schedule vehicles in time to alleviate traffic congestion becomes an important research topic.

Scheduling is inevitably inaccurate when vehicles are scheduled according to people's historical experience, for example, when it is determined according to historical experience whether it is necessary to schedule more buses. Therefore, it is necessary to provide a technical solution to accurately determine a vehicle scheduling strategy.

SUMMARY

An objective of embodiments of the present specification is to provide a method and an apparatus for determining a vehicle scheduling strategy, so as to accurately determine a vehicle scheduling strategy in a travel route.

To achieve the foregoing technical objective, the embodiments of the present specification are implemented as follows:

An embodiment of the present specification provides a method for determining a vehicle scheduling strategy, including: obtaining a signal strength sequence of a detection signal detected by scanning a travel route by a user terminal, where the detection signal is transmitted by a detection signal source disposed at a preset location in the travel route; determining travel information of a user according to the signal strength sequence of the detection signal; and reporting the travel information to a server, to determine a vehicle scheduling strategy corresponding to the travel route by using the server.

An embodiment of the present specification provides a method for determining a vehicle scheduling strategy, including: obtaining travel information of a plurality of users, where the travel information is determined according to signal strength sequences of a detection signal detected by scanning a travel route by user terminals, and the detection signal is transmitted by a detection signal source disposed at a preset location in the travel route; and determining a vehicle scheduling strategy corresponding to the travel route according to the travel information of the plurality of users.

An embodiment of the present specification provides a method for determining a vehicle scheduling strategy, including: obtaining signal strength sequences of a detection signal detected by scanning a travel route by a plurality of user terminals, where the detection signal is transmitted by a detection signal source disposed at a preset location in the travel route; determining travel information of a plurality of users according to the signal strength sequences of the detection signal; and determining a vehicle scheduling strategy corresponding to the travel route according to the travel information of the plurality of users.

An embodiment of the present specification provides an apparatus for determining a vehicle scheduling strategy, including: a first obtaining module, configured to obtain a signal strength sequence of a detection signal detected by scanning a travel route by a user terminal, where the detection signal is transmitted by a detection signal source disposed at a preset location in the travel route; a first determination module, configured to determine travel information of a user according to the signal strength sequence of the detection signal; and a reporting module, configured to report the travel information to a server, to determine a vehicle scheduling strategy corresponding to the travel route by using the server.

An embodiment of the present specification provides an apparatus for determining a vehicle scheduling strategy, including: a second obtaining module, configured to obtain travel information of a plurality of users, where the travel information is determined according to signal strength sequences of a detection signal detected by scanning a travel route by user terminals, and the detection signal is transmitted by a detection signal source disposed at a preset location in the travel route; and a second determination module, configured to determine a vehicle scheduling strategy corresponding to the travel route according to the travel information of the plurality of users.

An embodiment of the present specification provides an apparatus for determining a vehicle scheduling strategy, including: a third obtaining module, configured to obtain signal strength sequences of a detection signal detected by scanning a travel route by a plurality of user terminals, where the detection signal is transmitted by a detection signal source disposed at a preset location in the travel route; a third determination module, configured to determine travel information of a plurality of users according to the signal strength sequences of the detection signal; and a fourth determination module, configured to determine a vehicle scheduling strategy corresponding to the travel route according to the travel information of the plurality of users.

An embodiment of the present specification provides a device for determining a vehicle scheduling strategy, including: a processor; and a memory configured to store computer-executable instructions, where the computer-executable instructions, when being executed, causes the processor to implement the steps of the foregoing method for determining a vehicle scheduling strategy.

An embodiment of the present specification provides a storage medium, configured to store computer-executable instructions, where the computer-executable instructions, when being executed, implements the steps of the foregoing method for determining a vehicle scheduling strategy.

Yet another embodiment of the present specification provides a method. The method includes: obtaining a signal strength sequence of signals detected by a user terminal during a travel route, wherein the detected signals are originated from signal sources disposed at different locations in the travel route, wherein the different location includes one or more vehicles or one or more stops; extracting, from the signal strength sequence, a first sequence fragment corresponding to a signal transmitted by a signal source disposed at a vehicle; determining a travel time duration of the user riding on the vehicle according to a signal strength value and time stamp information of the first sequence fragment; extracting, from the signal strength sequence, a second sequence fragment corresponding to a signal transmitted by a signal source disposed at a stop; and determining, based on the travel time duration, a travel departure stop, a waiting time duration the user spends until the vehicle arrives at the travel departure stop, and a travel destination stop of the user according to a signal strength value and time stamp information of the second sequence fragment.

In some embodiments, the determining a travel time duration of the user riding on the vehicle according to a signal strength value and time stamp information of the first sequence fragment comprises: extracting, from the first sequence fragment according to the signal strength value and the time stamp information of the first sequence fragment, a first target fragment having a duration greater than a first time duration threshold and having a maximum signal strength value greater than or equal to a first signal strength threshold; determining a time duration of the first target fragment as the travel time duration of the user; and determining a vehicle corresponding to the first target fragment as a vehicle used by the user, wherein the first target fragment includes an identification of the vehicle.

In some embodiments, the determining, based on the travel time duration, a travel departure stop, a waiting time duration the user spends until the vehicle arrives at the travel departure stop, and a travel destination stop of the user according to a signal strength value and time stamp information of the second sequence fragment comprises: extracting, from the second sequence fragment according to the signal strength value and the time stamp information of the second sequence fragment, a second target fragment having an end time and a maximum signal strength value greater than or equal to a second signal strength threshold, wherein a time duration between the end time of the second target fragment and a start time of the travel time duration is less than a second time duration threshold; determining stop corresponding to the second target fragment as the travel departure stop of the user; determining a duration of the second target fragment as the waiting time duration of the user; and extracting, from the second sequence fragment according to the signal strength value and the time stamp information of the second sequence fragment, a third target fragment having a start time and a maximum signal strength value greater than or equal to a third signal strength threshold, wherein a time duration between the start time of the third target fragment and an end time of the travel time duration is less than a third time duration threshold, and determining a stop corresponding to the third target fragment as the travel destination stop of the user.

In some embodiments, before the determining a travel time duration of the user riding on a vehicle according to a signal strength value and time stamp information of the first sequence fragment, the method further comprises: filtering the first sequence fragment. The determining a travel time duration of the user riding on a vehicle according to a signal strength value and time stamp information of the first sequence fragment, comprises: determining the travel time duration according to a signal strength value and time stamp information of the filtered first sequence fragment.

In some embodiments, the filtering the first sequence fragment comprises: dividing, based on a set time duration, the first sequence fragment into a plurality of first sub-fragments according to the time stamp information of the first sequence fragment, and using, in the first sub-fragments, an average value or a median value of signal strength values of the first sub-fragments as a final signal strength value of the first sub-fragments.

In some embodiments, before the determining, based on the travel time duration, a travel departure stop, a waiting time duration the user spends until the vehicle arrives at the travel departure stop, and a travel destination stop of the user according to a signal strength value and time stamp information of the second sequence fragment, the method further comprises: filtering the second sequence fragment. The determining, based on the travel time duration, a travel departure stop, a waiting time duration the user spends until the vehicle arrives at the travel departure stop, and a travel destination stop of the user according to a signal strength value and time stamp information of the second sequence fragment comprises: determining, based on the travel time duration, the travel departure stop, the waiting time duration, and the travel destination stop of the user according to a signal strength value and time stamp information of the filtered second sequence fragment.

In some embodiments, the filtering the second sequence fragment comprises: dividing, based on the set time duration, the second sequence fragment into a plurality of second sub-fragments according to the time stamp information of the second sequence fragment, and using, in the second sub-fragments, an average value or a median value of signal strength values of the second sub-fragments as a final signal strength value of the second sub-fragments.

In some embodiments, the method further includes: predicting a next departure time of the user according to the travel information of the user; and controlling the user terminal to load a ride module before the next departure time, wherein the ride module is used by the user to take a vehicle in the travel route.

Yet another embodiment of the present specification provides an apparatus. According to some embodiments, the apparatus includes one or more processors and a memory storing instructions executable by the one or more processors to causes the one or more processors to perform operations including: obtaining a signal strength sequence of signals detected by a user terminal during a travel route, wherein the detected signals are originated from signal sources disposed at different locations in the travel route, wherein the different location includes one or more vehicles or one or more stops; extracting, from the signal strength sequence, a first sequence fragment corresponding to a signal transmitted by a signal source disposed at a vehicle; determining a travel time duration of the user riding on the vehicle according to a signal strength value and time stamp information of the first sequence fragment; extracting, from the signal strength sequence, a second sequence fragment corresponding to a signal transmitted by a signal source disposed at a stop; and determining, based on the travel time duration, a travel departure stop, a waiting time duration the user spends until the vehicle arrives at the travel departure stop, and a travel destination stop of the user according to a signal strength value and time stamp information of the second sequence fragment.

Yet another embodiment of the present specification provides one or more non-transitory computer-readable storage media configured with instructions executable by one or more processors to cause the one or more processors to perform operations including: obtaining a signal strength sequence of signals detected by a user terminal during a travel route, wherein the detected signals are originated from signal sources disposed at different locations in the travel route, wherein the different location includes one or more vehicles or one or more stops; extracting, from the signal strength sequence, a first sequence fragment corresponding to a signal transmitted by a signal source disposed at a vehicle; determining a travel time duration of the user riding on the vehicle according to a signal strength value and time stamp information of the first sequence fragment; extracting, from the signal strength sequence, a second sequence fragment corresponding to a signal transmitted by a signal source disposed at a stop; and determining, based on the travel time duration, a travel departure stop, a waiting time duration the user spends until the vehicle arrives at the travel departure stop, and a travel destination stop of the user according to a signal strength value and time stamp information of the second sequence fragment.

By means of the technical solution in the embodiments of the present specification, a vehicle scheduling strategy corresponding to a travel route can be determined based on a signal strength sequence of a detection signal detected by scanning the travel route by a user terminal, thereby accurately determining a vehicle scheduling strategy in the travel route.

BRIEF DESCRIPTION OF THE DRAWINGS

To describe the technical solutions in the embodiments of the present specification or in the existing technologies more clearly, the following briefly introduces the accompanying drawings required for describing the embodiments or the existing technologies. Apparently, the accompanying drawings in the following description show merely some embodiments of the present specification, and a person of ordinary skill in the art may still derive other drawings from these accompanying drawings without creative efforts.

DETAILED DESCRIPTION OF THE EMBODIMENTS

To enable a person skilled in the art to better understand the technical solutions of the present specification, the technical solutions of the embodiments of the present specification will be described clearly and thoroughly below with reference to the accompanying drawings of the embodiments of the present specification. Apparently, the described embodiments are merely some rather than all of the embodiments of the present specification. All other embodiments obtained by a person of ordinary skill in the art based on the embodiments of the present specification without creative efforts shall fall within the protection scope of the present specification.

An objective of the embodiments of the present specification is to provide a method and an apparatus for determining a vehicle scheduling strategy, so as to accurately determine a vehicle scheduling strategy in a travel route.

Figure 1:
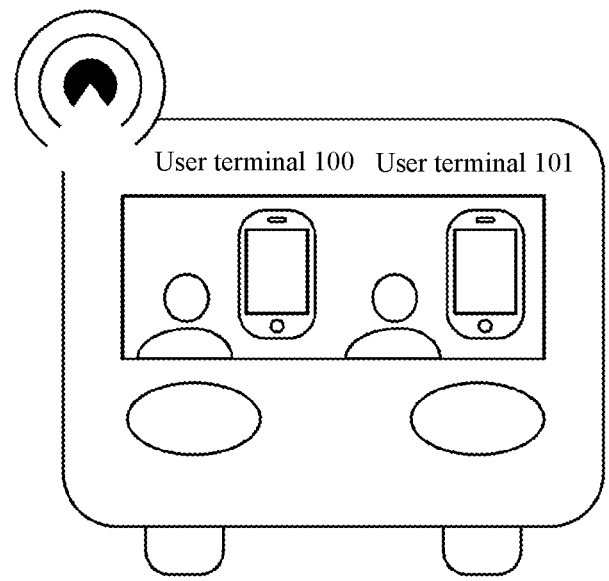
FIG. 1 is a schematic diagram of an application scenario of a method for determining a vehicle scheduling strategy according to an embodiment of the present specification.
Figure 1:
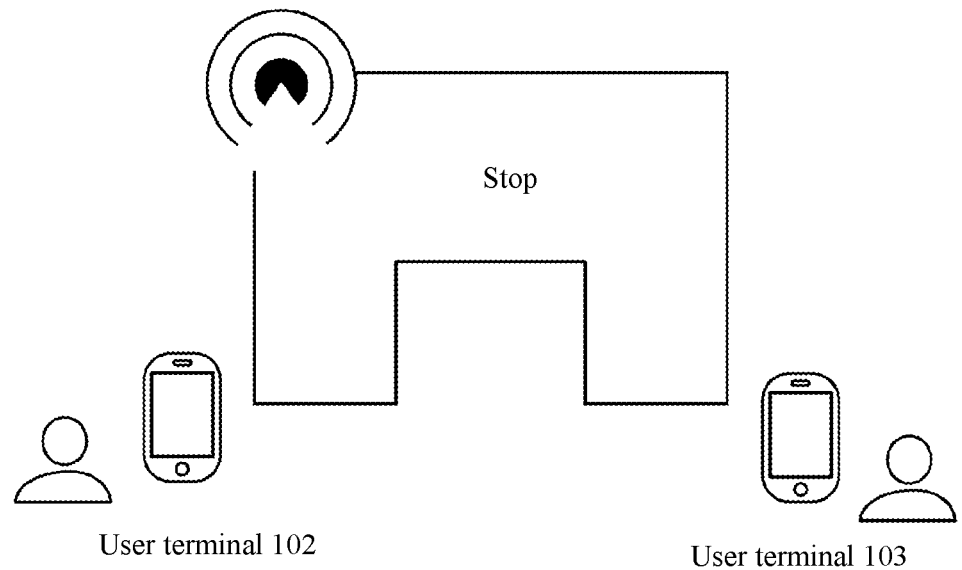

FIG. 1 is a schematic diagram of an application scenario of a method for determining a vehicle scheduling strategy according to an embodiment of the present specification. As shown in FIG. 1, the scenario includes a user terminal and a detection signal source. The scenario may include, as shown in FIG. 1, a user terminal 100, a user terminal 101, a user terminal 102, a user terminal 103, a detection signal source 200, and a detection signal source 201. A detection signal source is disposed at a preset location in a travel route. For example, a detection signal source is disposed at a stop or a vehicle in the travel route. The vehicle may be a bus or a subway train. The detection signal source may transmit a detection signal. A user terminal may perform a scan to obtain the detection signal and generate a signal strength sequence. In one case, the detection signal source is a Wi-Fi (a wireless local area network (WLAN) technology) probe device, and the detection signal is a Wi-Fi signal. In another case, the detection signal source is a Bluetooth device, and the detection signal is a Bluetooth signal. The method for determining a vehicle scheduling strategy in this embodiment of the present specification may be implemented based on a signal strength sequence, generated by a user terminal, of a detection signal, so that a vehicle scheduling strategy is determined accurately in a travel route. In this embodiment, the user terminal may be a device such as a mobile phone, a computer or a tablet computer. In FIG. 1, for example, the preset location is a stop or a vehicle. The preset location in the travel route may be another location. This is not limited herein.

Figure 2:
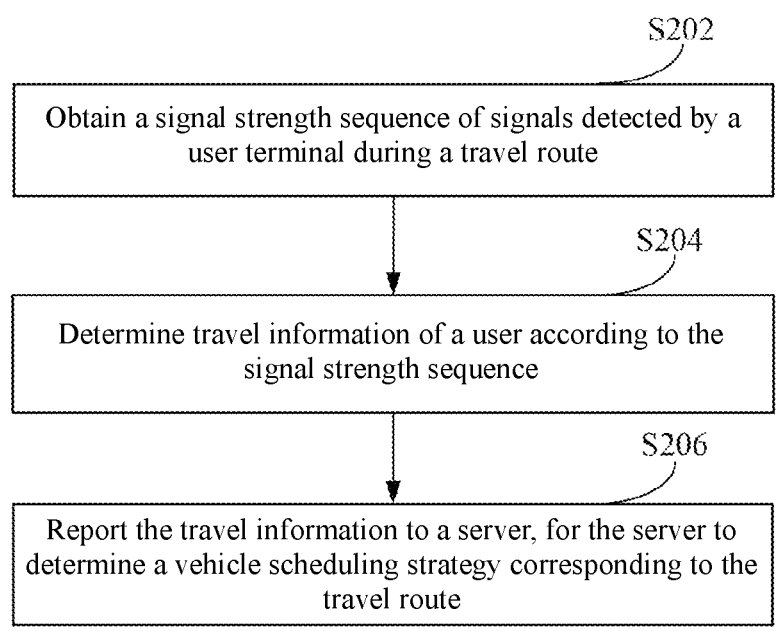
FIG. 2 is a schematic flowchart of a method for determining a vehicle scheduling strategy according to an embodiment of the present specification.

FIG. 2 is a schematic flowchart of a method for determining a vehicle scheduling strategy according to an embodiment of the present specification. The method may be implemented by a user terminal. As shown in FIG. 2, the method includes the following steps.

In step S202, the method includes obtaining a signal strength sequence of a detection signal detected by scanning a travel route by a user terminal, where the detection signal is transmitted by a detection signal source disposed at a preset location in the travel route.

In step S204, the method includes determining travel information of a user according to the signal strength sequence of the detection signal.

In step S206, the method includes reporting the travel information to a server, to determine a vehicle scheduling strategy corresponding to the travel route by using the server.

In this embodiment of the present specification, a signal strength sequence of a detection signal detected by scanning a travel route by a user terminal is first obtained. Travel information of a user is then determined according to the signal strength sequence of the detection signal. The travel information is finally reported to a server, to determine a vehicle scheduling strategy corresponding to the travel route by using the server. The detection signal is transmitted by a detection signal source disposed at a preset location in the travel route. It can be learned that, in this embodiment of the present specification, a vehicle scheduling strategy corresponding to a travel route can be determined based on a signal strength sequence of a detection signal detected by scanning the travel route by a user terminal, thereby accurately determining a vehicle scheduling strategy in the travel route.

In step S202, if the user terminal is located at a preset location in the travel route, the user terminal may perform a scan to detect the detection signal transmitted by the detection signal source disposed at the preset location. The preset location is a vehicle or a stop. The detection signal may be a Wi-Fi signal or a Bluetooth signal. After performing a scan to detect the detection signal, the user terminal may generate the signal strength sequence of the detection signal according to the strength of the detection signal. As the location of the user terminal changes, the signal strength sequence of the detection signal may include signal strength sequences of detection signals corresponding to detection signal sources located at a plurality of preset locations.

In step S202, the signal strength sequence of the detection signal detected by scanning the travel route by the user terminal is obtained. The signal strength sequence may be represented in the form of a curved line or a broken line. The curved line or broken line represents a correspondence between time and a signal strength value. A greater signal strength value indicates a closer distance between the user terminal and the detection signal source.

In this embodiment, there are a plurality of preset locations in the travel route. To distinguish between different preset locations through detection signals, an identity (ID) may be set in the detection signals. For detection signal sources located at a same preset location, a same ID is carried in detection signals of the detection signal sources. For detection signal sources located at different preset locations, different IDs are carried in detection signals of the detection signal sources. In this way, the preset locations are distinguished by using IDs carried in detection signals. In a preferred embodiment, one detection signal source is disposed at each preset location. Detection signals of different detection signal sources carry different IDs. In the foregoing ID setting manner, after receiving detection signals, the user terminal may distinguish between the preset locations according to IDs carried in the detection signals and distinguish between signal strength sequences corresponding to the preset locations among signal strength sequences of the detection signals according to the IDs carried in the detection signals. The signal strength sequence of the detection signal includes signal strength sequences of detection signals corresponding to detection signal sources located at a plurality of preset locations.

Figure 3A:
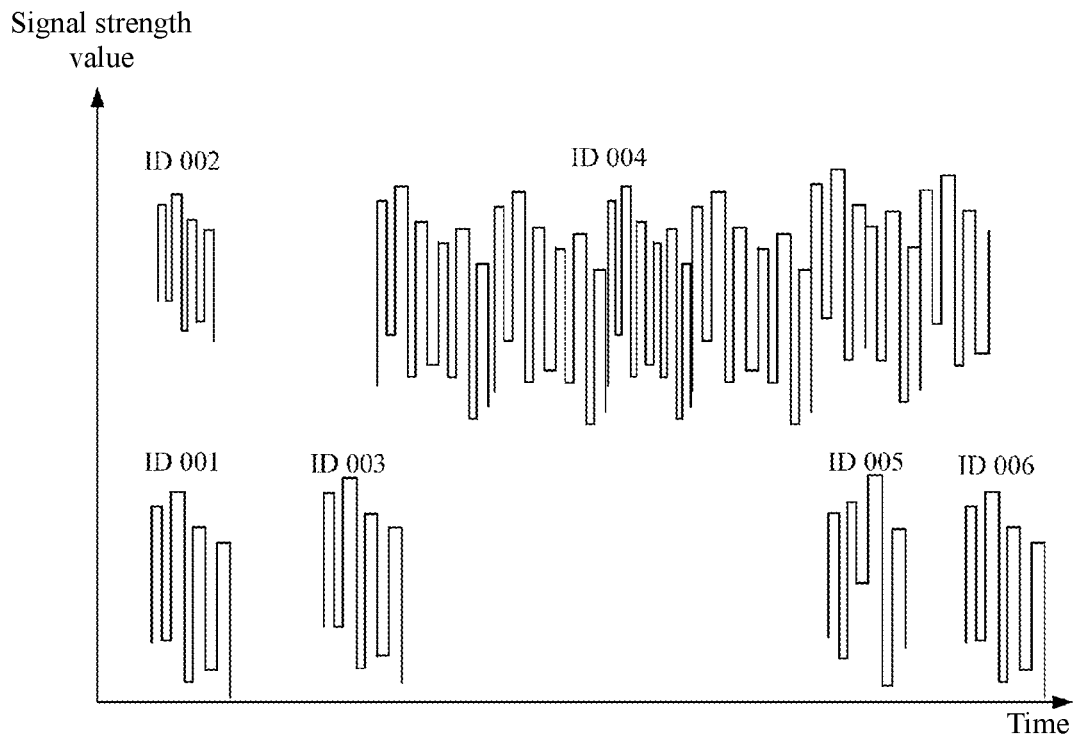
FIG. 3A is a schematic diagram of a signal strength sequence of a detection signal according to an embodiment of the present specification.

FIG. 3A is a schematic diagram of a signal strength sequence of a detection signal according to an embodiment of the present specification. In FIG. 3A, a horizontal coordinate represents time, and a vertical coordinate represents a signal strength value. The signal strength sequence in FIG. 3A corresponds to a total of six detection signals, and IDs carried in the six detection signals are respectively 001, 002, 003, 004, 005, and 006. In FIG. 3A, preset locations corresponding to the ID 001, the ID 003, the ID 005, and the ID 006 are stops, and preset locations corresponding to the ID 002 and the ID 004 are buses. The signal strength sequence of the detection signal in FIG. 3A may be explained as follows: A user walks past the stop corresponding to the ID 001. At the same time, the bus corresponding to the ID 002 passes by the user. The user keeps walking, passes by the stop corresponding to the ID 003, and takes the bus corresponding to the ID 004. During the ride, the user passes by the stop corresponding to the ID 005 and gets off at the stop corresponding to the ID 006. In FIG. 3A, to distinguish a signal strength value corresponding to a stop from a signal strength value corresponding to a vehicle, a value range of a signal strength value corresponding to a stop and a value range of a signal strength value corresponding to a vehicle are set to be different. During actual application, a value range of a signal strength value corresponding to a stop and a value range of a signal strength value corresponding to a vehicle may be the same or may be different.

In step S204, the determining travel information of a user according to the signal strength sequence of the detection signal may include the following operations:

(a1) extracting, from the signal strength sequence, a first sequence fragment corresponding to a detection signal transmitted by a detection signal source disposed at a vehicle and a second sequence fragment corresponding to a detection signal transmitted by a detection signal source disposed at a stop;

(a2) determining a travel time range and a used vehicle of the user according to a signal strength value and time stamp information that correspond to the first sequence fragment, and determining a travel departure stop, a vehicle waiting time length, and a travel destination stop of the user according to a signal strength value and time stamp information that correspond to the second sequence fragment and the travel time range; and (a3) using the travel time range, the used vehicle, the travel departure stop, the vehicle waiting time length, and the travel destination stop of the user as the travel information of the user.

In the action (a1), for detection signal sources located at different preset locations, different IDs are carried in detection signals of the detection signal sources. Therefore, in the signal strength sequence, according to the IDs carried in the detection signals, a detection signal transmitted by a detection signal source disposed at a vehicle may be distinguished from a detection signal transmitted by a detection signal source disposed at a stop. Therefore, the first sequence fragment corresponding to the detection signal transmitted by the detection signal source disposed at the vehicle and the second sequence fragment corresponding to the detection signal transmitted by the detection signal source disposed at the stop are extracted from the signal strength sequence.

FIG. 3A is used as an example. In FIG. 3A, the preset locations corresponding to the ID 001, the ID 003, the ID 005, and the ID 006 are stops. The preset locations corresponding to the ID 002 and the ID 004 are buses. Signal strength sequence fragments corresponding to the ID 002 and the ID 004 may be separately extracted from FIG. 3A and used as the first sequence fragment. Signal strength sequence fragments corresponding to the ID 001, the ID 003, the ID 005, and the ID 006 may be separately extracted from FIG. 3A and used as the second sequence fragment.

In the action (a2), the travel time range and the used vehicle of the user are determined according to the signal strength value and the time stamp information that correspond to the first sequence fragment. Specifically, because during a ride of the user, a ride time length is inevitably greater than a particular time length, and the user is inside the vehicle. Therefore, the detection signal that is transmitted by the detection signal source located at the vehicle and is received by the user terminal has a relatively large signal strength value. Therefore, in this embodiment, a first target fragment with duration greater than a first time length threshold and with a maximum signal strength value greater than or equal to a first strength threshold is extracted from the first sequence fragment according to the signal strength value and the time stamp information that correspond to the first sequence fragment, and the first target fragment is a corresponding sequence fragment when the user takes the vehicle. In addition, a time range corresponding to the first target fragment is determined as the travel time range of the user, and a vehicle corresponding to the first target fragment is determined as the used vehicle of the user.

In this embodiment, a correspondence between an ID carried in a detection signal and a vehicle identifier is pre-recorded. For a detection signal transmitted by a detection signal source located at a vehicle, a vehicle identifier corresponding to the detection signal can be determined according to an ID carried in the detection signal. Therefore, in the foregoing process, a vehicle identifier corresponding to the first target fragment may be determined, and a vehicle indicated by the vehicle identifier corresponding to the first target fragment is determined as the used vehicle of the user. In this embodiment, the time range corresponding to the first target fragment may be determined according to a start time and an end time of the first target fragment, so that the travel time range of the user is determined.

It can be understood that, for a sequence fragment that exists in the first sequence fragment and has duration less than or equal to a time length threshold, a possible scenario is that a moving bus or subway train passes by the user. For a sequence fragment that exists in the first sequence fragment and has a maximum signal strength value less than the first strength threshold, a possible scenario is that the user moves at a place relatively far away from the bus. For example, the user is a resident shop worker near the vehicle.

Figure 3B:
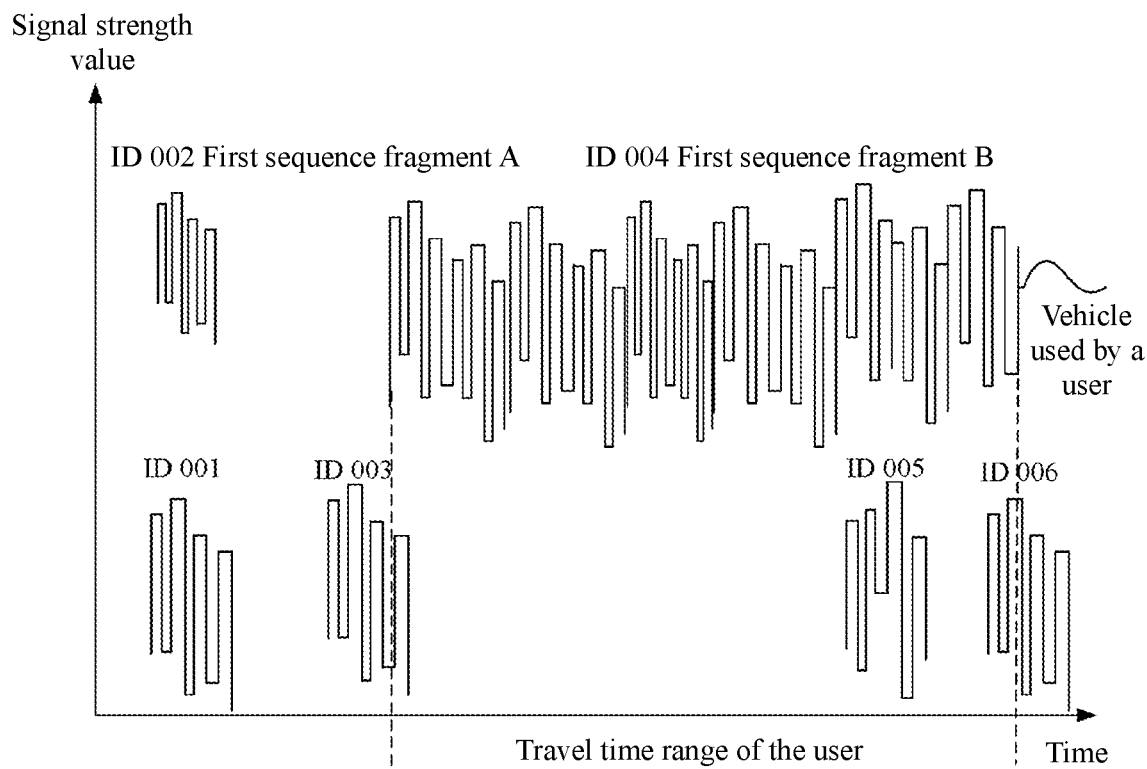
FIG. 3B is a schematic diagram of determining a travel time range and a used vehicle of a user corresponding to FIG. 3A according to an embodiment of the present specification.

FIG. 3B is a schematic diagram of determining a travel time range and a used vehicle of a user corresponding to FIG. 3A according to an embodiment of the present specification. As shown in FIG. 3B, the first sequence fragment is first extracted from the signal strength sequence in FIG. 3A. The first sequence fragment includes a first sequence fragment A and a first sequence fragment B (which correspond to the ID 002 and the ID 004, respectively). The first sequence fragment B with duration greater than the first time length threshold and with a maximum signal strength value greater than or equal to the first strength threshold is extracted from the first sequence fragment and used as the first target fragment. A time range corresponding to a first target fragment B is determined as the travel time range of the user. A vehicle identifier corresponding to the first target fragment B is determined as the used vehicle of the user. For the first sequence fragment A, a possible scenario is that a moving bus or subway train passes by the user.

In the action (a2), the travel departure stop, the vehicle waiting time length, and the travel destination stop of the user are determined according to the signal strength value and the time stamp information that correspond to the second sequence fragment and the travel time range. Specifically, as the user gets on a vehicle, the user terminal receives, almost at the same time, a detection signal from a boarding stop and a detection signal from the vehicle, and the detection signal from the boarding stop has higher strength. Therefore, in this embodiment, a second target fragment with an end time and with a maximum signal strength value greater than or equal to a second strength threshold is extracted from the second sequence fragment according to the signal strength value and the time stamp information that correspond to the second sequence fragment, where a time length between the end time and a start time of the travel time range is less than a second time length threshold. The second target fragment is a sequence fragment corresponding to the travel departure stop of the user. In addition, a stop corresponding to the second target fragment is determined as the travel departure stop of the user, and duration of the second target fragment is determined as the vehicle waiting time length of the user.

In this embodiment, a correspondence between an ID carried in a detection signal and a stop identifier is pre-recorded. For a detection signal transmitted by a detection signal source located at a vehicle, a stop identifier corresponding to the detection signal can be determined according to an ID carried in the detection signal. Therefore, in the foregoing process, a stop identifier corresponding to the second target fragment may be determined, and a stop indicated by the stop identifier corresponding to the second target fragment is determined as the travel departure stop of the user. In this embodiment, the duration of the second target fragment may be determined according to a start time and an end time of the second target fragment, so that the vehicle waiting time length of the user is determined.

It can be understood that, for a sequence fragment which is in the second sequence fragment and has an end time, where a time length between the end time and the start time of the travel time range is less than the second time length threshold, a possible scenario is that the user passes by a stop before taking the vehicle. For a sequence fragment that exists in the second sequence fragment and has a maximum signal strength value less than the second strength threshold, a possible scenario is that the user moves at a place relatively far away from the stop. For example, the user is a resident shop worker near the stop.

Figure 3C:
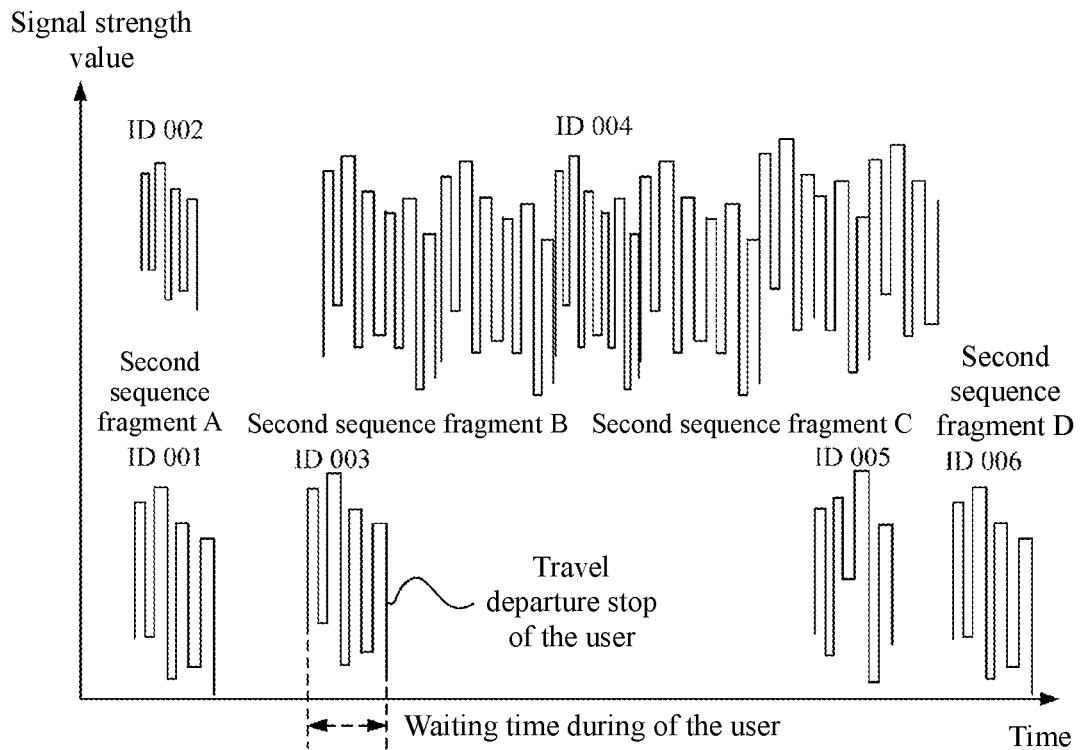
FIG. 3C is a schematic diagram of determining a travel departure stop and a vehicle waiting time length of a user corresponding to FIG. 3A according to an embodiment of the present specification.

FIG. 3C is a schematic diagram of determining a travel departure stop and a vehicle waiting time length of a user corresponding to FIG. 3A according to an embodiment of the present specification. As shown in FIG. 3C, the second sequence fragment is first extracted from the signal strength sequence in FIG. 3A. The second sequence fragment includes a sequence fragment A, a sequence fragment B, a sequence fragment C, and a sequence fragment D (which correspond to the ID 001, the ID 003, the ID 005, and the ID 006, respectively). The sequence fragment B with an end time and with a maximum signal strength value greater than or equal to the second strength threshold is then extracted from the sequence fragment A, the sequence fragment B, the sequence fragment C, and the sequence fragment D and used as the second target fragment, where a time length between the end time and the start time of the travel time range is less than the second time length threshold. A stop corresponding to a second target fragment B is determined as the travel departure stop of the user, and duration of the second target fragment B is determined as the vehicle waiting time length of the user. For the second sequence fragment A, a possible scenario is that the user passes by the stop before taking the vehicle.

In the action (a2), the travel departure stop, the vehicle waiting time length, and the travel destination stop of the user are determined according to the signal strength value and the time stamp information that correspond to the second sequence fragment and the travel time range. Specifically, as the user gets off a vehicle, the user terminal receives, almost at the same time, a detection signal from an alighting stop and a detection signal from the vehicle, and the detection signal from the alighting stop has higher strength. Therefore, in this embodiment, a third target fragment with a start time and with a maximum signal strength value greater than or equal to a third strength threshold is extracted from the second sequence fragment according to the signal strength value and the time stamp information that correspond to the second sequence fragment, where a time length between the start time and an end time of the travel time range is less than a third time length threshold. The third target fragment is a sequence fragment corresponding to the travel destination stop of the user. In addition, a stop corresponding to the third target fragment is determined as the travel destination stop of the user.

In this embodiment, a correspondence between an ID carried in a detection signal and a stop identifier is pre-recorded. For a detection signal transmitted by a detection signal source located at a vehicle, a stop identifier corresponding to the detection signal can be determined according to an ID carried in the detection signal. Therefore, in the foregoing process, a stop identifier corresponding to the third target fragment may be determined, and a stop indicated by the stop identifier corresponding to the third target fragment is determined as the travel destination stop of the user.

It can be understood that, for a sequence fragment which is in the second sequence fragment and has a start time, where a time length between the start time and the end time of the travel time range is less than the third time length threshold, a possible scenario is that the user passes by a stop during a ride or the user passes by a stop after getting off. For a sequence fragment that exists in the second sequence fragment and has a maximum signal strength value less than the third strength threshold, a possible scenario is that the user moves at a place relatively far away from the stop. For example, the user is a resident shop worker near the stop.

Figure 3D:
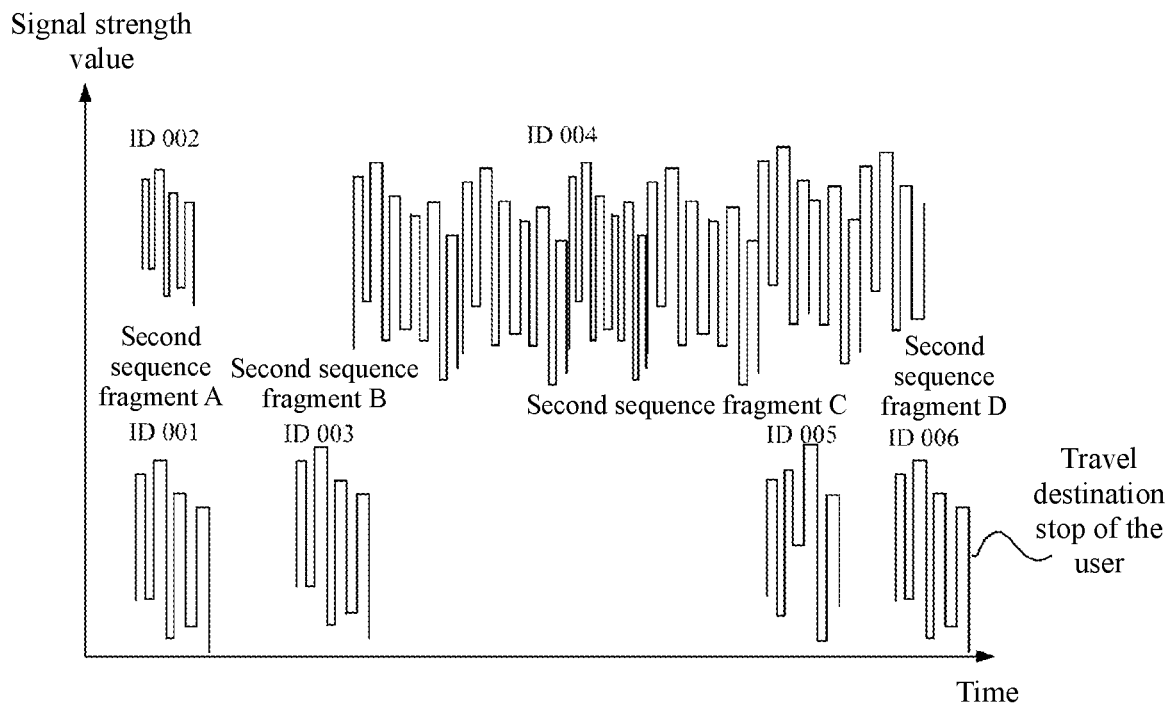
FIG. 3D is a schematic diagram of determining a travel destination stop of a user corresponding to FIG. 3A according to an embodiment of the present specification.

FIG. 3D is a schematic diagram of determining a travel destination stop of a user corresponding to FIG. 3A according to an embodiment of the present specification. As shown in FIG. 3D, the second sequence fragment is first extracted from the signal strength sequence in FIG. 3A. The second sequence fragment includes a sequence fragment A, a sequence fragment B, a sequence fragment C, and a sequence fragment D (which correspond to the ID 001, the ID 003, the ID 005, and the ID 006, respectively). The sequence fragment D with a start time and with a maximum signal strength value greater than or equal to the third strength threshold is then extracted from the sequence fragment A, the sequence fragment B, the sequence fragment C, and the sequence fragment D and used as the third target fragment, where a time length between the start time and the end time of the travel time range is less than the third time length threshold. A stop corresponding to the third target fragment D is determined as the travel destination stop of the user. For the second sequence fragment C, a possible scenario is that the user passes by the stop during a ride.

In the action (a3), the travel time range, the used vehicle, the travel departure stop, the vehicle waiting time length, and the travel destination stop of the user are used as the travel information of the user. Through the action (a1) to the action (a3), the travel information of the user can be determined according to the signal strength sequence of the detection signal. The first time length threshold, the first strength threshold, the second time length threshold, the second strength threshold, the third time length threshold, and the third strength threshold that are related to the action (a1) to the action (a3) may all be set as required.

In step S206, after the travel information of the user is determined, the travel information may further be reported to a server, to determine a vehicle scheduling strategy corresponding to the travel route by using the server. A specific action procedure of the server will be described below.

In this embodiment, considering a condition that there is a glitch in the collected first sequence fragment and second sequence fragment, before the determining the travel time range and the used vehicle of the user according to the signal strength value and the time stamp information that correspond to the first sequence fragment, and determining the travel departure stop, the vehicle waiting time length, and the travel destination stop of the user according to the signal strength value and the time stamp information that correspond to the second sequence fragment and the travel time range, filtering processing may further be separately performed on the first sequence fragment and the second sequence fragment, to filter out the glitch in the first sequence fragment and the second sequence fragment, so that the first sequence fragment and the second sequence fragment are smoother.

Correspondingly, the determining a travel time range and a used vehicle of the user according to a signal strength value and time stamp information that correspond to the first sequence fragment and determining a travel departure stop, a vehicle waiting time length, and a travel destination stop of the user according to a signal strength value and time stamp information that correspond to the second sequence fragment and the travel time range is specifically: determining the travel time range and the used vehicle of the user according to the signal strength value and the time stamp information that correspond to the first sequence fragment on which the filtering processing is performed, and determining the travel departure stop, the vehicle waiting time length, and the travel destination stop of the user according to the signal strength value and the time stamp information that correspond to the second sequence fragment on which the filtering processing is performed and the travel time range. For this procedure, reference may be made to the foregoing description. Details are not described herein again.

The separately performing filtering processing on the first sequence fragment and the second sequence fragment is specifically: dividing, based on a set time length, the first sequence fragment into a plurality of first sub-fragments according to the time stamp information that corresponds to the first sequence fragment, and using, in the first sub-fragments, an average value or a median value of signal strength values of the first sub-fragments as a final signal strength value of the first sub-fragments; and dividing, based on the set time length, the second sequence fragment into a plurality of second sub-fragments according to the time stamp information that corresponds to the second sequence fragment, and using, in the second sub-fragments, an average value or a median value of signal strength values of the second sub-fragments as a final signal strength value of the second sub-fragments.

It can be understood that, when performing a scan for a detection signal, the user terminal performs scans according to a particular time period, for example, performs a scan every 10 milliseconds. Therefore, the signal strength sequence is essentially a discrete data sequence. For such a discrete data sequence, in this embodiment, the median value of the signal strength values of the first sub-fragments may be calculated, or the median value of the signal strength values of the second sub-fragments may be calculated.

FIG. 3A is used as an example. In FIG. 3A, the signal strength sequence fragment corresponding to the ID 002 and the signal strength sequence fragment corresponding to the ID 004 are separately the first sequence fragments, and the signal strength sequence fragment corresponding to the ID 001, the signal strength sequence fragment corresponding to the ID 003, the signal strength sequence fragment corresponding to the ID 005, and the signal strength sequence fragment corresponding to the ID 006 are separately the second sequence fragments. In this embodiment, the set time length may be set to 3 seconds. For the first sequence fragment, the first sequence fragment is divided into a plurality of first sub-fragments in a manner of obtaining a sub-fragment every 3 seconds. For each first sub-fragment, an average value or a median value of signal strength values of the first sub-fragments is used as a final signal strength value of the first sub-fragments, so as to filter out the glitch and smooth the data.

Similarly, for the second sequence fragment, the second sequence fragment is divided into a plurality of second sub-fragments in a manner of obtaining a sub-fragment every 3 seconds. For each second sub-fragment, an average value or a median value of signal strength values of the second sub-fragment is used as a final signal strength value of the second sub-fragment, so as to filter out the glitch and smooth data.

It needs to be noted that, in a process of dividing the first sequence fragment into a plurality of first sub-fragments based on a set time length, it is only necessary to separately divide each first sequence fragment. If the remaining length of the first sequence fragment is less than the set time length, the remaining first sequence fragment is determined as a first sub-fragment. The remainders of first sequence fragments that are not adjacent in time do not need to be combined into one same first sub-fragment. Similarly, in a process of dividing the second sequence fragment into a plurality of second sub-fragments based on a set time length, it is only necessary to separately divide each second sequence fragment. If the remaining length of the second sequence fragment is less than the set time length, the remaining second sequence fragment is determined as a second sub-fragment. The remainders of second sequence fragments that are not adjacent in time do not need to be combined into one same second sub-fragment.

Figure 4:
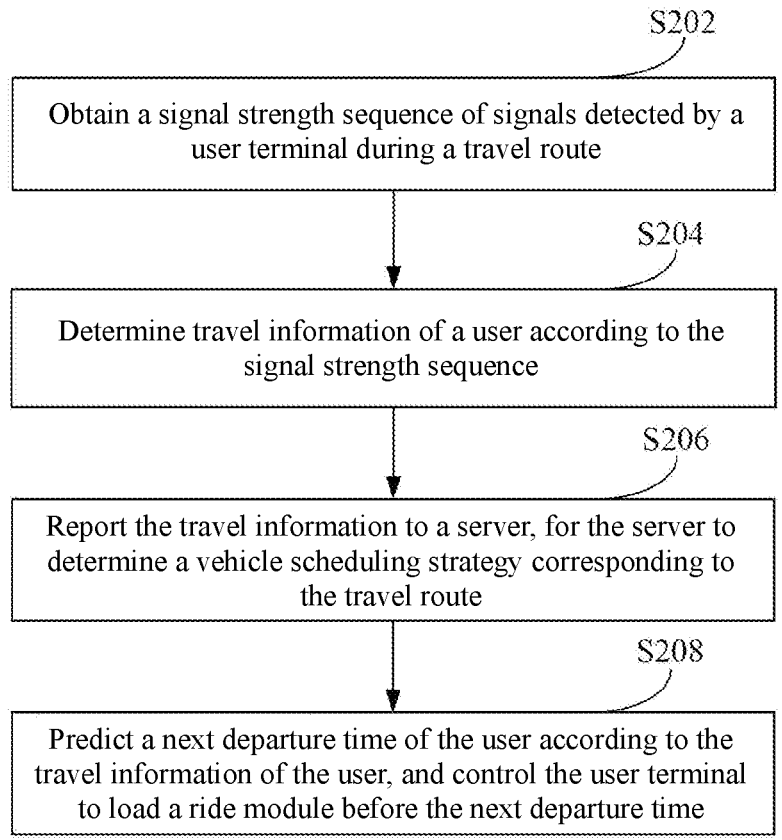
FIG. 4 is a flowchart of a method for determining a vehicle scheduling strategy according to another embodiment of the present specification.

FIG. 4 is a flowchart of a method for determining a vehicle scheduling strategy according to another embodiment of the present specification. The method may be performed by a user terminal. As shown in FIG. 4, the method includes the following steps:

In step S202, the method includes obtaining a signal strength sequence of a detection signal detected by scanning a travel route by a user terminal, where the detection signal is transmitted by a detection signal source disposed at a preset location in the travel route.

In step S204, the method includes determining travel information of a user according to the signal strength sequence of the detection signal.

In step S206, the method includes reporting the travel information to a server, to determine a vehicle scheduling strategy corresponding to the travel route by using the server.

In step S208, the method includes predicting a next departure time of the user according to the travel information of the user, and controlling the user terminal to load a ride module before the next departure time, where the ride module is used by the user to take a usable vehicle in the travel route.

Specifically, after the travel information of the user is determined, to facilitate travel of the user, the method in this embodiment may further include: predicting a next departure time of the user according to the travel information of the user, and controlling the user terminal to load a ride module before the next departure time, where the ride module is used by the user to take a usable vehicle in the travel route.

In an embodiment, assuming that it is determined by analyzing travel information of a user that the user takes Bus 601 at 8 a.m. every day, it is therefore predicted that a next departure time of the user is 8 a.m. the next day. Therefore, before 8 a.m. the next day, the user terminal is controlled to load the ride module. The ride module may be a two-dimensional (2D) barcode module. A code scanning device in the vehicle may implement a ride charging function by scanning a 2D barcode presented by the 2D barcode module.

In another embodiment, after the user terminal obtains a detection signal transmitted by a detection signal source disposed at a stop, if a time length of the detection signal is greater than a particular time length, the user terminal determines that the user is waiting for a vehicle at the stop and loads the ride module to facilitate the ride of the user.

It can be learned that, in this embodiment of the present specification, the next departure time of the user can further be predicted by using the travel information of the user, and the ride module is loaded in advance to facilitate the ride of the user.

Figure 5:
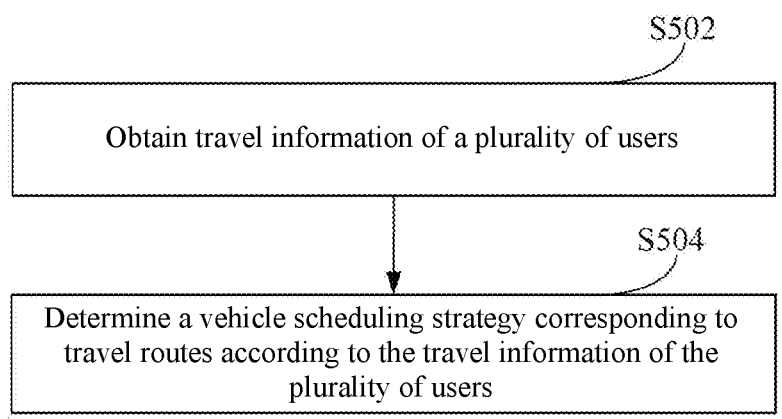
FIG. 5 is a flowchart of a method for determining a vehicle scheduling strategy according to another embodiment of the present specification.

FIG. 5 is a schematic flowchart of a method for determining a vehicle scheduling strategy according to another embodiment of the present specification. The method may be performed by a server. As shown in FIG. 5, the method includes the following steps:

In step S502, the method includes obtaining travel information of a plurality of users, where the travel information is determined according to signal strength sequences of a detection signal detected by scanning a travel route by user terminals, and the detection signal is transmitted by a detection signal source disposed at a preset location in the travel route.

In step S504, the method includes determining a vehicle scheduling strategy corresponding to the travel route according to the travel information of the plurality of users.

In this embodiment of the present specification, travel information of a plurality of users is first obtained, where the travel information is determined according to signal strength sequences of a detection signal detected by scanning a travel route by user terminals, and the detection signal is transmitted by a detection signal source disposed at a preset location in the travel route. A vehicle scheduling strategy corresponding to the travel route is then determined according to the travel information of the plurality of users. In this embodiment of the present specification, a vehicle scheduling strategy corresponding to a travel route can be determined according to travel information of a plurality of users, thereby accurately determining a vehicle scheduling strategy in the travel route.

A user terminal may determine travel information of a user by using the methods shown in FIG. 2 and FIG. 3. After each user terminal separately determines the travel information of one user and reports the travel information to the server, the server may obtain the travel information of the plurality of users. In step S502, the server receives the travel information of the user of each user terminal reported by a plurality of user terminals. It can be known from the methods and processes in FIG. 2 and FIG. 3 that travel information is determined according to a signal strength sequence of a detection signal detected by scanning a travel route by a user terminal, and the detection signal is transmitted by a detection signal source disposed at a preset location in the travel route.

In Step S504, the determining a vehicle scheduling strategy corresponding to the travel route according to the travel information of the plurality of users may include the following operations:

(b1) determining vehicle scheduling reference information according to the travel information of the plurality of users, where the vehicle scheduling reference information includes at least one piece of passenger quantity information of travel vehicles in travel routes in the travel route, waiting passenger quantity information of stops in the travel routes in the travel route, and vehicle waiting time length information of the stops in the travel routes in the travel route; and (b2) determining a vehicle scheduling strategy corresponding to the travel routes according to the vehicle scheduling reference information.

In this embodiment, the travel information includes the travel time range, the used vehicle, the travel departure stop, the vehicle waiting time length, and the travel destination stop of the user. In the action (b1), the determining passenger quantity information of travel vehicles in travel routes in the travel route according to the travel information of the plurality of users is specifically: determining, according to a travel departure stop, a travel destination stop, and a used vehicle of each user, a travel route of each user in the travel route and a travel vehicle used by each user in the travel route; determining passenger quantities of travel vehicles in travel routes in the travel route according to the travel route of each user in the travel route and the travel vehicle used by each user in the travel route; and using the passenger quantities as the passenger quantity information.

TABLE 1

| User identity | Travel departure stop | Travel destination stop | Code of a used vehicle |
|---|---|---|---|
| A | Hepingmen | Xuanhuamen | Bus 1001 |
| B | Zhuquejie | Baihualukou | Bus 4682 |
| C | Hepingmen | Xuanhuamen | Bus 1001 |

Table 1 is a schematic table of travel information of a plurality of users. Using Table 1 as an example, it is first determined, according to a travel departure stop, a travel destination stop, and a used vehicle of a user A, a travel departure stop, a travel destination stop, and a used vehicle of a user B, and a travel departure stop, a travel destination stop, and a used vehicle of a user C, that a travel route of the user A includes Bus Route 600 and a travel vehicle used by the user A in Bus Route 600 is Bus 1001, a travel route of the user B includes Bus Route 700 and a travel vehicle used by the user B in Bus Route 700 is Bus 4682, and a travel route of the user C includes Bus Route 600 and a travel vehicle used by the user C in Bus Route 600 is Bus 1001. Next, it is determined, according to the travel routes of the user A, the user B, and the user C in the travel route and the travel vehicles used by the user A, the user B, and the user C in the travel routes, that passenger quantities of the travel vehicles in the travel routes in the travel route are: Bus Route 600-Bus 1001-2 people, and Bus Route 700-Bus 4682-1 person. The passenger quantities are used as passenger quantity information.

Further, in this embodiment, the passenger quantity information, which changes with time, of the travel vehicles in the travel routes can further be determined in combination with travel time ranges of the users. Details are not described herein again.

In the action (b1), the determining waiting passenger quantity information of stops in the travel routes in the travel route according to the travel information of the plurality of users is specifically: determining, according to a travel departure stop, a travel destination stop, and a used vehicle of each user, a travel route of each user in the travel route and a travel departure stop in the travel route; determining waiting passenger quantities of the stops in the travel routes in the travel route according to the travel route of each user in the travel route and the travel departure stop in the travel route; and using the waiting passenger quantities as the passenger quantity information.

Using Table 1 as an example, it is determined that the travel departure stop of the user A is Hepingmen Stop of Bus Route 600, the travel departure stop of the user B is Zhuquejie Stop of Bus Route 700, and the travel departure stop of the user C is Hepingmen Stop of Bus Route 600. It is determined, according to the travel routes of the user A, the user B, and the user C in the travel route and the travel departure stops in the travel route, that waiting passenger quantities of the stops in the travel routes in the travel route are: Bus Route 600-Hepingmen Stop-2 people, and Bus Route 700-Zhuquejie Stop-1 person. The waiting passenger quantities are used as waiting passenger quantity information.

Further, in this embodiment, the waiting passenger quantity information, which changes with time, of the stops in the travel routes can further be determined in combination with the travel time ranges of the users. Details are not described herein again.

In the action (b1), the determining vehicle waiting time length information of stops in the travel routes in the travel route according to the travel information of the plurality of users is specifically: determining, according to a travel departure stop, a travel destination stop, and a used vehicle of each user, a travel route of each user in the travel route and a travel departure stop in the travel route; determining vehicle waiting time lengths of the stops in the travel routes in the travel route according to the travel route of each user in the travel route and the travel departure stop and a vehicle waiting time length in the travel route; and using the vehicle waiting time lengths as the vehicle waiting time length information.

Using Table 1 as an example, it is determined that the travel departure stop of the user A is Hepingmen Stop of Bus Route 600, the travel departure stop of the user B is Zhuquejie Stop of Bus Route 700, and the travel departure stop of the user C is Hepingmen Stop of Bus Route 600. It is obtained that a vehicle waiting time length of the user A is 5 minutes, a vehicle waiting time length of the user B is 10 minutes, and a vehicle waiting time length of the user C is 10 minutes. It is determined, according to the travel routes of the user A, the user B, and the user C in the travel route, the travel departure stops in the travel route, and the vehicle waiting time lengths of the user A, the user B, and the user C, that the vehicle waiting time lengths of the stops in the travel routes in the travel route are: Bus Route 600-Hepingmen Stop-(5+10)/2=7.5 minutes, and Bus Route 700-Zhuquejie Stop-10 minutes. The vehicle waiting time lengths are used as the vehicle waiting time length information.

Further, in this embodiment, the vehicle waiting time length information, which changes with time, of the stops in the travel routes can further be determined in combination with the travel time range of the user. Details are not described herein again.

In the action (b2), the determining a vehicle scheduling strategy corresponding to the travel routes according to the vehicle scheduling reference information may be: determining, according to the vehicle scheduling reference information, whether more buses need to be scheduled.

It can be learned that, in this embodiment, a vehicle scheduling strategy corresponding to a travel route can be determined according to travel information of a plurality of users, thereby accurately determining a vehicle scheduling strategy in the travel route.

Further, the method in this embodiment of the present specification further includes: predicting, for any user, a next departure time of the user according to the travel information of the user; and sending a ride module loading instruction to a user terminal corresponding to the user before the next departure time, to control the user terminal corresponding to the user to load a ride module, where the ride module is used by the user to take a usable vehicle in the travel route.

In an embodiment, for a user, assuming that it is determined, by analyzing the travel information of the user, that the user takes Bus 601 at 8 a.m. every day, it is therefore predicted that a next departure time of the user is 8 a.m. the next day. Therefore, before 8 a.m. the next day, a ride module loading instruction is sent to a user terminal corresponding to the user, to control the user terminal to load the ride module. The ride module may be a 2D barcode module. A code scanning device in the vehicle may implement a ride charging function by scanning a 2D barcode presented by the 2D barcode module.

It can be learned that, in this embodiment of the present specification, the next departure time of the user can further be predicted by using the travel information of the user, and the user terminal is controlled to load the ride module in advance, to facilitate the ride of the user.

Figure 6:
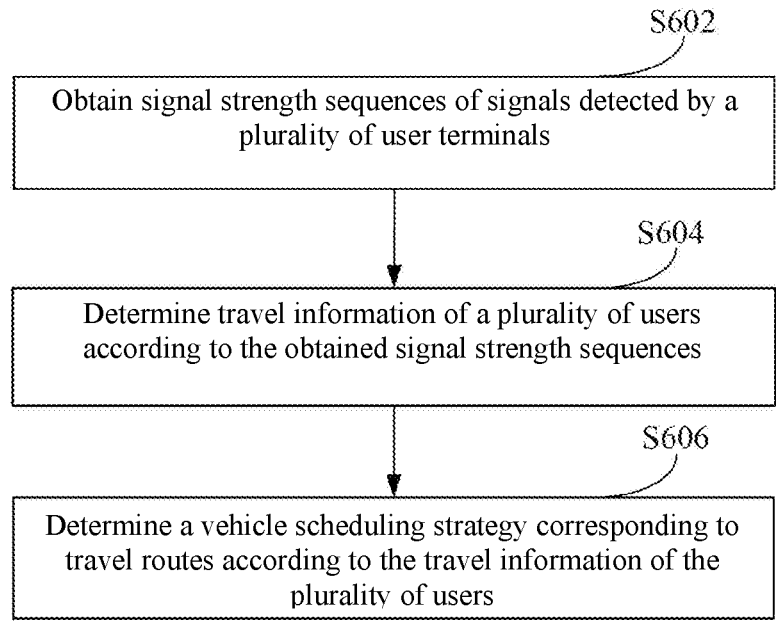
FIG. 6 is a flowchart of a method for determining a vehicle scheduling strategy according to another embodiment of the present specification.

FIG. 6 is a schematic flowchart of a method for determining a vehicle scheduling strategy according to another embodiment of the present specification. The method may be performed by a server. As shown in FIG. 6, the method includes the following steps:

In step S602, the method includes obtaining signal strength sequences of a detection signal detected by scanning a travel route by a plurality of user terminals, where the detection signal is transmitted by a detection signal source disposed at a preset location in the travel route.

In step S604, the method includes determining travel information of a plurality of users according to the obtained signal strength sequences of the detection signal.

In step S606, the method includes determining a vehicle scheduling strategy corresponding to the travel route according to the travel information of the plurality of users.

In this embodiment of the present specification, signal strength sequences of a detection signal detected by scanning a travel route by a plurality of user terminals are first obtained. Travel information of a plurality of users is then determined according to the obtained signal strength sequences of the detection signal. A vehicle scheduling strategy corresponding to the travel route is finally determined according to the travel information of the plurality of users. In this embodiment of the present specification, a vehicle scheduling strategy corresponding to a travel route can be determined according to travel information of a plurality of users, thereby accurately determining a vehicle scheduling strategy in the travel route.

In step S602 to step S604, after the signal strength sequences of the detection signal detected by scanning the travel route by the plurality of user terminals are obtained, the travel information of one user is determined according to a signal strength sequence corresponding to each user terminal. The user is a user using the user terminal. In this way, the travel information of the plurality of users may be obtained through step S604. In step S606, the vehicle scheduling strategy corresponding to the travel route is determined according to the travel information of the plurality of users.

In this embodiment, the preset location is a vehicle or a stop, and the determining travel information of a plurality of users according to the signal strength sequences of the detection signal includes: for the signal strength sequence detected by any user terminal through scanning, extracting, from the signal strength sequence, a first sequence fragment corresponding to a detection signal transmitted by a detection signal source disposed at a vehicle and a second sequence fragment corresponding to a detection signal transmitted by a detection signal source disposed at a stop; determining a travel time range and a used vehicle of a user of the user terminal according to a signal strength value and time stamp information that correspond to the first sequence fragment; determining a travel departure stop, a vehicle waiting time length, and a travel destination stop of the user of the user terminal according to a signal strength value and time stamp information that correspond to the second sequence fragment and the travel time range; and using the travel time range, the used vehicle, the travel departure stop, the vehicle waiting time length, and the travel destination stop of the user of the user terminal as the travel information of the user of the user terminal.

Specifically, the determining a travel time range and a used vehicle of a user of the user terminal according to a signal strength value and time stamp information that correspond to the first sequence fragment includes: extracting, from the first sequence fragment according to the signal strength value and the time stamp information that correspond to the first sequence fragment, a first target fragment with duration greater than a first time length threshold and with a maximum signal strength value greater than or equal to a first strength threshold; and determining a time range corresponding to the first target fragment as the travel time range of the user of the user terminal, and determining a vehicle corresponding to the first target fragment as the used vehicle of the user of the user terminal.

The determining a travel departure stop, a vehicle waiting time length, and a travel destination stop of the user of the user terminal according to a signal strength value and time stamp information that correspond to the second sequence fragment and the travel time range includes: extracting, from the second sequence fragment according to the signal strength value and the time stamp information that correspond to the second sequence fragment, a second target fragment with an end time and with a maximum signal strength value greater than or equal to a second strength threshold, where a time length between the end time and a start time of the travel time range is less than a second time length threshold, determining a stop corresponding to the second target fragment as the travel departure stop of the user of the user terminal, and determining duration of the second target fragment as the vehicle waiting time length of the user of the user terminal; and extracting, from the second sequence fragment according to the signal strength value and the time stamp information that correspond to the second sequence fragment, a third target fragment with a start time and with a maximum signal strength value greater than or equal to a third strength threshold, where a time length between the start time and an end time of the travel time range is less than a third time length threshold, and determining a stop corresponding to the third target fragment as the travel destination stop of the user of the user terminal.

Further, the determining a vehicle scheduling strategy corresponding to the travel route according to the travel information of the plurality of users includes: determining vehicle scheduling reference information according to the travel information of the plurality of users, where the vehicle scheduling reference information includes at least one piece of passenger quantity information of travel vehicles in travel routes in the travel route, waiting passenger quantity information of stops in the travel routes in the travel route, and vehicle waiting time length information of the stops in the travel routes in the travel route; and determining the vehicle scheduling strategy corresponding to the travel routes according to the vehicle scheduling reference information.

The method in this embodiment further includes: predicting, for any user, a next departure time of the user according to the travel information of the user; and sending a ride module loading instruction to a user terminal corresponding to the user before the next departure time, to control the user terminal corresponding to the user to load a ride module, where the ride module is used by the user to take a usable vehicle in the travel route.

For a specific procedure of the method in FIG. 6, reference may be made to the explanation of the methods in FIG. 2 to FIG. 5. Details are not described herein again. The method in FIG. 6 can achieve functions and effects of the methods in FIG. 2 to FIG. 5. Details are not described herein again.

Figure 7:
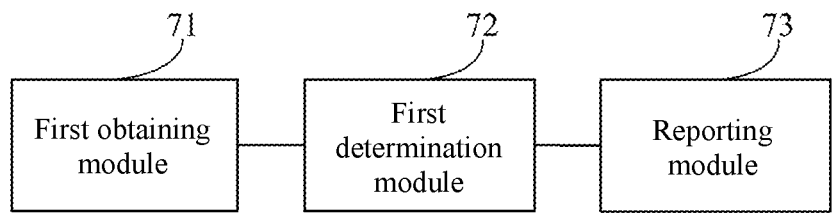
FIG. 7 is a block diagram of an apparatus for determining a vehicle scheduling strategy according to an embodiment of the present specification.

FIG. 7 is a schematic diagram of modules of an apparatus for determining a vehicle scheduling strategy according to an embodiment of the present specification. As shown in FIG. 7, the apparatus includes: a first obtaining module 71, configured to obtain a signal strength sequence of a detection signal detected by scanning a travel route by a user terminal, where the detection signal is transmitted by a detection signal source disposed at a preset location in the travel route; a first determination module 72, configured to determine travel information of a user according to the signal strength sequence of the detection signal; and a reporting module 73, configured to report the travel information to a server, to determine a vehicle scheduling strategy corresponding to the travel route by using the server.

In some embodiments, the preset location is a vehicle or a stop, and the first determination module 72 is specifically configured to: extract, from the signal strength sequence, a first sequence fragment corresponding to a detection signal transmitted by a detection signal source disposed at a vehicle and a second sequence fragment corresponding to a detection signal transmitted by a detection signal source disposed at a stop; determine a travel time range and a used vehicle of the user according to a signal strength value and time stamp information that correspond to the first sequence fragment, and determine a travel departure stop, a vehicle waiting time length, and a travel destination stop of the user according to a signal strength value and time stamp information that correspond to the second sequence fragment and the travel time range; and use the travel time range, the used vehicle, the travel departure stop, the vehicle waiting time length, and the travel destination stop of the user as the travel information of the user.

In some embodiments, the first determination module 72 is further specifically configured to: extract, from the first sequence fragment according to the signal strength value and the time stamp information that correspond to the first sequence fragment, a first target fragment with duration greater than a first time length threshold and with a maximum signal strength value greater than or equal to a first strength threshold; and determine a time range corresponding to the first target fragment as the travel time range of the user, and determine a vehicle corresponding to the first target fragment as the used vehicle of the user.

In some embodiments, the first determination module 72 is further specifically configured to: extract, from the second sequence fragment according to the signal strength value and the time stamp information that correspond to the second sequence fragment, a second target fragment with an end time and with a maximum signal strength value greater than or equal to a second strength threshold, where a time length between the end time and a start time of the travel time range is less than a second time length threshold, determine a stop corresponding to the second target fragment as the travel departure stop of the user, and determine duration of the second target fragment as the vehicle waiting time length of the user; and extract, from the second sequence fragment according to the signal strength value and the time stamp information that correspond to the second sequence fragment, a third target fragment with a start time and with a maximum signal strength value greater than or equal to a third strength threshold, where a time length between the start time and an end time of the travel time range is less than a third time length threshold, and determine a stop corresponding to the third target fragment as the travel destination stop of the user.

In some embodiments, the apparatus further includes a filtering module, configured to separately perform filtering processing on the first sequence fragment and the second sequence fragment before the determining a travel time range and a used vehicle of the user according to a signal strength value and time stamp information that correspond to the first sequence fragment and determining a travel departure stop, a vehicle waiting time length, and a travel destination stop of the user according to a signal strength value and time stamp information that correspond to the second sequence fragment and the travel time range. Correspondingly, the first determination module 72 is further specifically configured to: determine the travel time range and the used vehicle of the user according to the signal strength value and the time stamp information that correspond to the first sequence fragment on which the filtering processing is performed, and determine the travel departure stop, the vehicle waiting time length, and the travel destination stop of the user according to the signal strength value and the time stamp information that correspond to the second sequence fragment on which the filtering processing is performed and the travel time range.

In some embodiments, the filtering module is specifically configured to: divide, based on a set time length, the first sequence fragment into a plurality of first sub-fragments according to the time stamp information that corresponds to the first sequence fragment, and use, in the first sub-fragments, an average value or a median value of signal strength values of the first sub-fragments as a final signal strength value of the first sub-fragments; and divide, based on the set time length, the second sequence fragment into a plurality of second sub-fragments according to the time stamp information that corresponds to the second sequence fragment, and use, in the second sub-fragments, an average value or a median value of signal strength values of the second sub-fragments as a final signal strength value of the second sub-fragments.

In some embodiments, the apparatus further includes a control module, configured to: predict a next departure time of the user according to the travel information of the user; and control the user terminal to load a ride module before the next departure time, where the ride module is used by the user to take a usable vehicle in the travel route.

In this embodiment of the present specification, a signal strength sequence of a detection signal detected by scanning a travel route by a user terminal is first obtained. Travel information of a user is then determined according to the signal strength sequence of the detection signal. The travel information is finally reported to a server, to determine a vehicle scheduling strategy corresponding to the travel route by using the server. The detection signal is transmitted by a detection signal source disposed at a preset location in the travel route. It can be learned that, in this embodiment of the present specification, a vehicle scheduling strategy corresponding to a travel route can be determined based on a signal strength sequence of a detection signal detected by scanning the travel route by a user terminal, thereby accurately determining a vehicle scheduling strategy in the travel route.

The apparatus for determining a vehicle scheduling strategy in this embodiment of the present specification can implement the processes of the foregoing method for determining a vehicle scheduling strategy, and in particular, the processes of the method for determining a vehicle scheduling strategy in FIG. 2 to FIG. 4. In addition, the apparatus can achieve the same functions and effects. Details are not described herein again.

Figure 8:
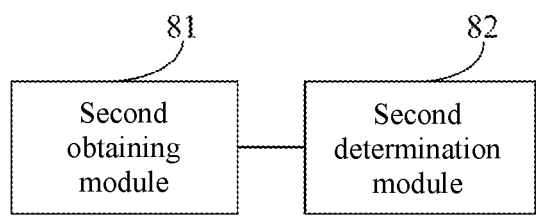
FIG. 8 is a block diagram of an apparatus for determining a vehicle scheduling strategy according to another embodiment of the present specification.

FIG. 8 is a schematic diagram of modules of an apparatus for determining a vehicle scheduling strategy according to another embodiment of the present specification. As shown in FIG. 8, the apparatus includes: a second obtaining module 81, configured to obtain travel information of a plurality of users, where the travel information is determined according to signal strength sequences of a detection signal detected by scanning a travel route by user terminals, and the detection signal is transmitted by a detection signal source disposed at a preset location in the travel route; and a second determination module 82, configured to determine a vehicle scheduling strategy corresponding to the travel route according to the travel information of the plurality of users.

In some embodiments, the second determination module is specifically configured to: determine vehicle scheduling reference information according to the travel information of the plurality of users, where the vehicle scheduling reference information includes at least one piece of passenger quantity information of travel vehicles in travel routes in the travel route, waiting passenger quantity information of stops in the travel routes in the travel route, and vehicle waiting time length information of the stops in the travel routes in the travel route; and determine a vehicle scheduling strategy corresponding to the travel routes according to the vehicle scheduling reference information.

In some embodiments, the apparatus further includes a control module, configured to: predict, for any user, a next departure time of the user according to the travel information of the user; and send a ride module loading instruction to a user terminal corresponding to the user before the next departure time, to control the user terminal corresponding to the user to load a ride module, where the ride module is used by the user to take a usable vehicle in the travel route.

In this embodiment of the present specification, travel information of a plurality of users is first obtained, where the travel information is determined according to signal strength sequences of a detection signal detected by scanning a travel route by user terminals, and the detection signal is transmitted by a detection signal source disposed at a preset location in the travel route. A vehicle scheduling strategy corresponding to the travel route is then determined according to the travel information of the plurality of users. In this embodiment of the present specification, a vehicle scheduling strategy corresponding to a travel route can be determined according to travel information of a plurality of users, thereby accurately determining a vehicle scheduling strategy in the travel route.

The apparatus for determining a vehicle scheduling strategy in this embodiment of the present specification can implement the processes of the foregoing method for determining a vehicle scheduling strategy, and in particular, the processes of the method for determining a vehicle scheduling strategy in FIG. 5. In addition, the apparatus can achieve the same functions and effects. Details are not described herein again.

Figure 9:
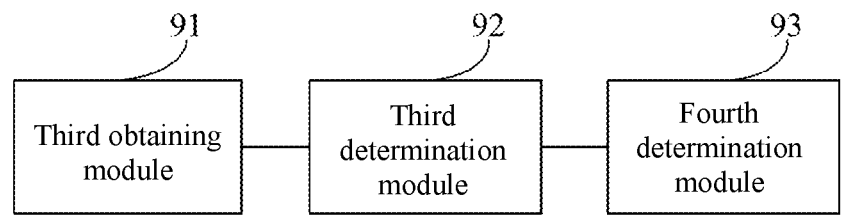
FIG. 9 is a block diagram of an apparatus for determining a vehicle scheduling strategy according to another embodiment of the present specification.

FIG. 9 is a schematic diagram of modules of an apparatus for determining a vehicle scheduling strategy according to another embodiment of the present specification. As shown in FIG. 9, the apparatus includes: a third obtaining module 91, configured to obtain signal strength sequences of a detection signal detected by scanning a travel route by a plurality of user terminals, where the detection signal is transmitted by a detection signal source disposed at a preset location in the travel route; a third determination module 92, configured to determine travel information of a plurality of users according to the signal strength sequences of the detection signal; and a fourth determination module 93, configured to determine a vehicle scheduling strategy corresponding to the travel route according to the travel information of the plurality of users.

In some embodiments, the preset location is a vehicle or a stop, and the third determination module 92 is specifically configured to: for the signal strength sequence detected by any user terminal through scanning, extract, from the signal strength sequence, a first sequence fragment corresponding to a detection signal transmitted by a detection signal source disposed at a vehicle and a second sequence fragment corresponding to a detection signal transmitted by a detection signal source disposed at a stop; determine a travel time range and a used vehicle of the user of the user terminal according to a signal strength value and time stamp information that correspond to the first sequence fragment, and determine a travel departure stop, a vehicle waiting time length, and a travel destination stop of the user of the user terminal according to a signal strength value and time stamp information that correspond to the second sequence fragment and the travel time range; and use the travel time range, the used vehicle, the travel departure stop, the vehicle waiting time length, and the travel destination stop of the user of the user terminal as the travel information of the user of the user terminal.

In some embodiments, the third determination module 92 is further specifically configured to: extract, from the first sequence fragment according to the signal strength value and the time stamp information that correspond to the first sequence fragment, a first target fragment with duration greater than a first time length threshold and with a maximum signal strength value greater than or equal to a first strength threshold; and determine a time range corresponding to the first target fragment as the travel time range of the user of the user terminal, and determine a vehicle corresponding to the first target fragment as the used vehicle of the user of the user terminal.

Specifically, the third determination module 92 is further specifically configured to: extract, from the second sequence fragment according to the signal strength value and the time stamp information that correspond to the second sequence fragment, a second target fragment with an end time and with a maximum signal strength value greater than or equal to a second strength threshold, where a time length between the end time and a start time of the travel time range is less than a second time length threshold, determine a stop corresponding to the second target fragment as the travel departure stop of the user of the user terminal, and determine duration of the second target fragment as the vehicle waiting time length of the user of the user terminal; and extract, from the second sequence fragment according to the signal strength value and the time stamp information that correspond to the second sequence fragment, a third target fragment with a start time and with a maximum signal strength value greater than or equal to a third strength threshold, where a time length between the start time and an end time of the travel time range is less than a third time length threshold, and determine a stop corresponding to the third target fragment as the travel destination stop of the user of the user terminal.

In some embodiments, the fourth determination module 93 is specifically configured to: determine vehicle scheduling reference information according to the travel information of the plurality of users, where the vehicle scheduling reference information includes at least one piece of passenger quantity information of travel vehicles in travel routes in the travel route, waiting passenger quantity information of stops in the travel routes in the travel route, and vehicle waiting time length information of the stops in the travel routes in the travel route; and determine a vehicle scheduling strategy corresponding to the travel routes according to the vehicle scheduling reference information.

In some embodiments, the apparatus further includes a control module, configured to: predict, for any user, a next departure time of the user according to the travel information of the user; and send a ride module loading instruction to a user terminal corresponding to the user before the next departure time, to control the user terminal corresponding to the user to load a ride module, where the ride module is used by the user to take a usable vehicle in the travel route.

In this embodiment of the present specification, signal strength sequences of a detection signal detected by scanning a travel route by a plurality of user terminals are first obtained. Travel information of a plurality of users is then determined according to the obtained signal strength sequences of the detection signal. A vehicle scheduling strategy corresponding to the travel route is finally determined according to the travel information of the plurality of users. In this embodiment of the present specification, a vehicle scheduling strategy corresponding to a travel route can be determined according to travel information of a plurality of users, thereby accurately determining a vehicle scheduling strategy in the travel route.

The apparatus for determining a vehicle scheduling strategy in this embodiment of the present specification can implement the processes of the foregoing method for determining a vehicle scheduling strategy, and in particular, the processes of the method for determining a vehicle scheduling strategy in FIG. 6. In addition, the apparatus can achieve the same functions and effects. Details are not described herein again.

Figure 10:
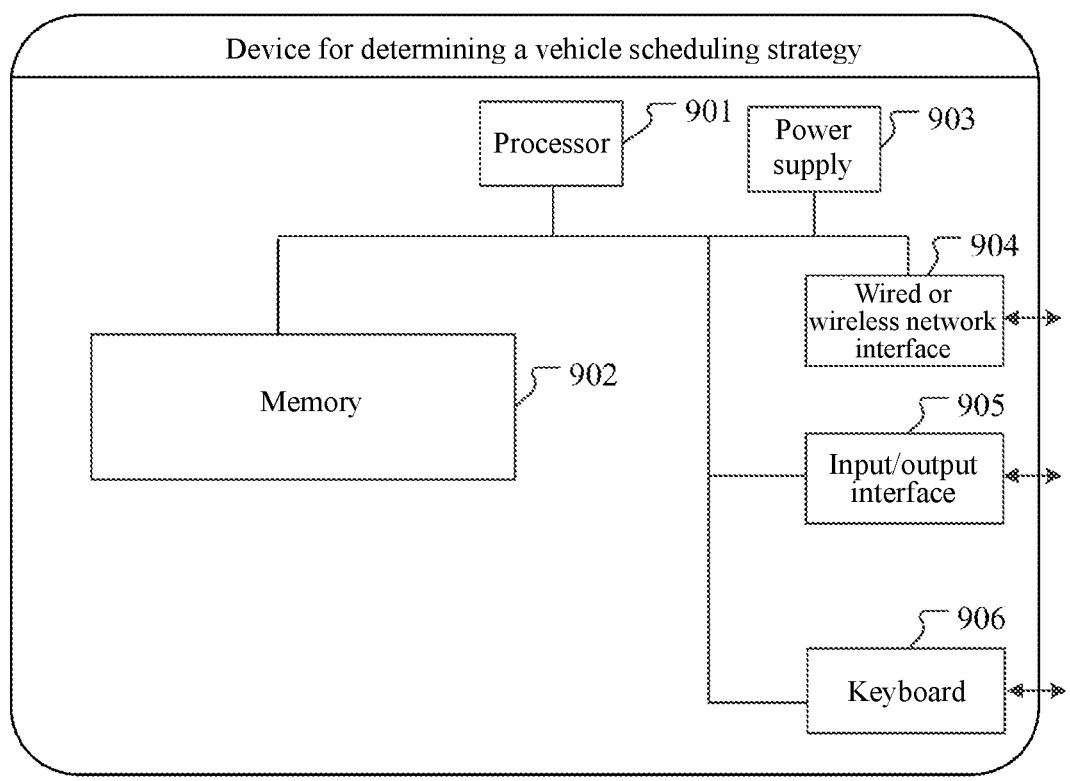
FIG. 10 is a schematic structural diagram of a device for determining a vehicle scheduling strategy according to an embodiment of the present specification.

An embodiment of the present specification further provides a device for determining a vehicle scheduling strategy. FIG. 10 is a schematic structural diagram of a device for determining a vehicle scheduling strategy according to an embodiment of the present specification. As shown in FIG. 10, the device for determining a vehicle scheduling strategy may vary greatly due to different configurations or performance, and may include one or more processors 901 and a memory 902. The memory 902 may store one or more applications or data. The memory 902 may implement transient storage or persistent storage. The application stored in the memory 902 may include one or more modules (not shown), and each module may include a series of computer-executable instructions in the device for determining a vehicle scheduling strategy. Further, the processor 901 may be configured to: communicate with the memory 902, and execute, on the device for determining a vehicle scheduling strategy, the series of computer-executable instructions in the memory 902. The device for determining a vehicle scheduling strategy may further include one or more power supplies 903, one or more wired or wireless network interfaces 904, one or more input/output interfaces 905, one or more keyboards 906, and the like.

In a specific embodiment, the device for determining a vehicle scheduling strategy includes a memory and one or more programs. The one or more programs are stored in the memory, and may include one or more modules. Each module may include a series of computer-executable instructions in the device for determining a vehicle scheduling strategy, and one or more processors are configured to execute the one or more programs to implement the following operations: obtaining a signal strength sequence of a detection signal detected by scanning a travel route by a user terminal, where the detection signal is transmitted by a detection signal source disposed at a preset location in the travel route; determining travel information of a user according to the signal strength sequence of the detection signal; and reporting the travel information to a server, to determine a vehicle scheduling strategy corresponding to the travel route by using the server.

In some embodiments, when the computer-executable instructions are executed, the preset location is a vehicle or a stop, and the determining travel information of a user according to the signal strength sequence of the detection signal includes: extracting, from the signal strength sequence, a first sequence fragment corresponding to a detection signal transmitted by a detection signal source disposed at a vehicle and a second sequence fragment corresponding to a detection signal transmitted by a detection signal source disposed at a stop; determining a travel time range and a used vehicle of the user according to a signal strength value and time stamp information that correspond to the first sequence fragment, and determining a travel departure stop, a vehicle waiting time length, and a travel destination stop of the user according to a signal strength value and time stamp information that correspond to the second sequence fragment and the travel time range; and using the travel time range, the used vehicle, the travel departure stop, the vehicle waiting time length, and the travel destination stop of the user as the travel information of the user.

In some embodiments, when the computer-executable instructions are executed, the determining a travel time range and a used vehicle of the user according to a signal strength value and time stamp information that correspond to the first sequence fragment includes: extracting, from the first sequence fragment according to the signal strength value and the time stamp information that correspond to the first sequence fragment, a first target fragment with duration greater than a first time length threshold and with a maximum signal strength value greater than or equal to a first strength threshold; and determining a time range corresponding to the first target fragment as the travel time range of the user, and determining a vehicle corresponding to the first target fragment as the used vehicle of the user.

In some embodiments, when the computer-executable instructions are executed, the determining a travel departure stop, a vehicle waiting time length, and a travel destination stop of the user according to a signal strength value and time stamp information that correspond to the second sequence fragment and the travel time range the user includes: extracting, from the second sequence fragment according to the signal strength value and the time stamp information that correspond to the second sequence fragment, a second target fragment with an end time and with a maximum signal strength value greater than or equal to a second strength threshold, where a time length between the end time and a start time of the travel time range is less than a second time length threshold, determining a stop corresponding to the second target fragment as the travel departure stop of the user, and determining duration of the second target fragment as the vehicle waiting time length of the user; and extracting, from the second sequence fragment according to the signal strength value and the time stamp information that correspond to the second sequence fragment, a third target fragment with a start time and with a maximum signal strength value greater than or equal to a third strength threshold, where a time length between the start time and an end time of the travel time range is less than a third time length threshold, and determining a stop corresponding to the third target fragment as the travel destination stop of the user.

In some embodiments, when the computer-executable instructions are executed, before the determining a travel time range and a used vehicle of the user according to a signal strength value and time stamp information that correspond to the first sequence fragment, and determining a travel departure stop, a vehicle waiting time length, and a travel destination stop of the user according to a signal strength value and time stamp information that correspond to the second sequence fragment and the travel time range, the method further includes: separately performing filtering processing on the first sequence fragment and the second sequence fragment; and the determining a travel time range and a used vehicle of the user according to a signal strength value and time stamp information that correspond to the first sequence fragment, and determining a travel departure stop, a vehicle waiting time length, and a travel destination stop of the user according to a signal strength value and time stamp information that correspond to the second sequence fragment and the travel time range includes: determining the travel time range and the used vehicle of the user according to the signal strength value and the time stamp information that correspond to the first sequence fragment on which the filtering processing is performed, and determining the travel departure stop, the vehicle waiting time length, and the travel destination stop of the user according to the signal strength value and the time stamp information that correspond to the second sequence fragment on which the filtering processing is performed and the travel time range.

In some embodiments, when the computer-executable instructions are executed, the separately performing filtering processing on the first sequence fragment and the second sequence fragment includes: dividing, based on a set time length, the first sequence fragment into a plurality of first sub-fragments according to the time stamp information that corresponds to the first sequence fragment, and using, in the first sub-fragments, an average value or a median value of signal strength values of the first sub-fragments as a final signal strength value of the first sub-fragments; and dividing, based on the set time length, the second sequence fragment into a plurality of second sub-fragments according to the time stamp information that corresponds to the second sequence fragment, and using, in the second sub-fragments, an average value or a median value of signal strength values of the second sub-fragments as a final signal strength value of the second sub-fragments.

In some embodiments, when the computer-executable instructions are executed, the method further includes: predicting a next departure time of the user according to the travel information of the user; and controlling the user terminal to load a ride module before the next departure time, where the ride module is used by the user to take a usable vehicle in the travel route.

In this embodiment of the present specification, a vehicle scheduling strategy corresponding to a travel route can be determined based on a signal strength sequence of a detection signal detected by scanning the travel route by a user terminal, thereby accurately determining a vehicle scheduling strategy in the travel route.

The device for determining a vehicle scheduling strategy in this embodiment of the present specification can implement the processes of the foregoing method for determining a vehicle scheduling strategy, and in particular, the processes of the method for determining a vehicle scheduling strategy in FIG. 2 to FIG. 4. In addition, the apparatus can achieve the same functions and effects. Details are not described herein again.

In another specific embodiment, the device for determining a vehicle scheduling strategy includes a memory and one or more programs. The one or more programs are stored in the memory, and may include one or more modules. Each module may include a series of computer-executable instructions in the device for determining a vehicle scheduling strategy, and one or more processors are configured to execute the one or more programs to implement the following operations: obtaining travel information of a plurality of users, where the travel information is determined according to signal strength sequences of a detection signal detected by scanning a travel route by user terminals, and the detection signal is transmitted by a detection signal source disposed at a preset location in the travel route; and determining a vehicle scheduling strategy corresponding to the travel route according to the travel information of the plurality of users.

In some embodiments, when the computer-executable instructions are executed, the determining a vehicle scheduling strategy corresponding to the travel route according to the travel information of the plurality of users includes: determining vehicle scheduling reference information according to the travel information of the plurality of users, where the vehicle scheduling reference information includes at least one piece of passenger quantity information of travel vehicles in travel routes in the travel route, waiting passenger quantity information of stops in the travel routes in the travel route, and vehicle waiting time length information of the stops in the travel routes in the travel route; and determining the vehicle scheduling strategy corresponding to the travel routes according to the vehicle scheduling reference information.

In some embodiments, when the computer-executable instructions are executed, the method further includes: predicting, for any user, a next departure time of the user according to the travel information of the user; and sending a ride module loading instruction to a user terminal corresponding to the user before the next departure time, to control the user terminal corresponding to the user to load a ride module, where the ride module is used by the user to take a usable vehicle in the travel route.

In this embodiment of the present specification, a vehicle scheduling strategy corresponding to a travel route can be determined according to travel information of a plurality of users, thereby accurately determining a vehicle scheduling strategy in the travel route.

The device for determining a vehicle scheduling strategy in this embodiment of the present specification can implement the processes of the foregoing method for determining a vehicle scheduling strategy, and in particular, the processes of the method for determining a vehicle scheduling strategy in FIG. 5. In addition, the apparatus can achieve the same functions and effects. Details are not described herein again.

In another specific embodiment, the device for determining a vehicle scheduling strategy includes a memory and one or more programs. The one or more programs are stored in the memory, and may include one or more modules. Each module may include a series of computer-executable instructions in the device for determining a vehicle scheduling strategy, and one or more processors are configured to execute the one or more programs to implement the following operations: obtaining signal strength sequences of a detection signal detected by scanning a travel route by a plurality of user terminals, where the detection signal is transmitted by a detection signal source disposed at a preset location in the travel route; determining travel information of a plurality of users according to the signal strength sequences of the detection signal; and determining a vehicle scheduling strategy corresponding to the travel route according to the travel information of the plurality of users.

In some embodiments, when the computer-executable instructions are executed, the preset location is a vehicle or a stop, and the determining travel information of a plurality of users according to the signal strength sequences of the detection signal includes: for the signal strength sequence detected by any user terminal through scanning, extracting, from the signal strength sequence, a first sequence fragment corresponding to a detection signal transmitted by a detection signal source disposed at a vehicle and a second sequence fragment corresponding to a detection signal transmitted by a detection signal source disposed at a stop; determining a travel time range and a used vehicle of a user of the user terminal according to a signal strength value and time stamp information that correspond to the first sequence fragment; determining a travel departure stop, a vehicle waiting time length, and a travel destination stop of the user of the user terminal according to a signal strength value and time stamp information that correspond to the second sequence fragment and the travel time range; and using the travel time range, the used vehicle, the travel departure stop, the vehicle waiting time length, and the travel destination stop of the user of the user terminal as the travel information of the user of the user terminal.

In some embodiments, when the computer-executable instructions are executed, the determining a travel time range and a used vehicle of the user of the user terminal according to a signal strength value and time stamp information that correspond to the first sequence fragment includes: extracting, from the first sequence fragment according to the signal strength value and the time stamp information that correspond to the first sequence fragment, a first target fragment with duration greater than a first time length threshold and with a maximum signal strength value greater than or equal to a first strength threshold; and determining a time range corresponding to the first target fragment as the travel time range of the user of the user terminal, and determining a vehicle corresponding to the first target fragment as the used vehicle of the user of the user terminal.

In some embodiments, when the computer-executable instructions are executed, the determining a travel departure stop, a vehicle waiting time length, and a travel destination stop of the user of the user terminal according to a signal strength value and time stamp information that correspond to the second sequence fragment and the travel time range includes: extracting, from the second sequence fragment according to the signal strength value and the time stamp information that correspond to the second sequence fragment, a second target fragment with an end time and with a maximum signal strength value greater than or equal to a second strength threshold, where a time length between the end time and a start time of the travel time range is less than a second time length threshold, determining a stop corresponding to the second target fragment as the travel departure stop of the user of the user terminal, and determining duration of the second target fragment as the vehicle waiting time length of the user of the user terminal; and extracting, from the second sequence fragment according to the signal strength value and the time stamp information that correspond to the second sequence fragment, a third target fragment with a start time and with a maximum signal strength value greater than or equal to a third strength threshold, where a time length between the start time and an end time of the travel time range is less than a third time length threshold, and determining a stop corresponding to the third target fragment as the travel destination stop of the user of the user terminal.

In some embodiments, when the computer-executable instructions are executed, the determining a vehicle scheduling strategy corresponding to the travel route according to the travel information of the plurality of users includes: determining vehicle scheduling reference information according to the travel information of the plurality of users, where the vehicle scheduling reference information includes at least one piece of passenger quantity information of travel vehicles in travel routes in the travel route, waiting passenger quantity information of stops in the travel routes in the travel route, and vehicle waiting time length information of the stops in the travel routes in the travel route; and determining the vehicle scheduling strategy corresponding to the travel routes according to the vehicle scheduling reference information.

In some embodiments, when the computer-executable instructions are executed, the method further includes: predicting, for any user, a next departure time of the user according to the travel information of the user; and sending a ride module loading instruction to a user terminal corresponding to the user before the next departure time, to control the user terminal corresponding to the user to load a ride module, where the ride module is used by the user to take a usable vehicle in the travel route.

In this embodiment of the present specification, a vehicle scheduling strategy corresponding to a travel route can be determined according to travel information of a plurality of users, thereby accurately determining a vehicle scheduling strategy in the travel route.

The apparatus for determining a vehicle scheduling strategy in this embodiment of the present specification can implement the processes of the foregoing method for determining a vehicle scheduling strategy, and in particular, the processes of the method for determining a vehicle scheduling strategy in FIG. 6. In addition, the apparatus can achieve the same functions and effects. Details are not described herein again.

Further, an embodiment of the present specification further provides a storage medium, configured to store computer-executable instructions. In a specific embodiment, the storage medium may be a Universal Serial Bus (USB) flash drive, an optical disc, a hard disk or the like. The computer-executable instructions stored in the storage medium, when executed by a processor, can implement the following operations: obtaining a signal strength sequence of a detection signal detected by scanning a travel route by a user terminal, where the detection signal is transmitted by a detection signal source disposed at a preset location in the travel route; determining travel information of a user according to the signal strength sequence of the detection signal; and reporting the travel information to a server, to determine a vehicle scheduling strategy corresponding to the travel route by using the server.

In some embodiments, when the computer-executable instructions stored in the storage medium are executed by the processor, the preset location is a vehicle or a stop, and the determining travel information of a user according to the signal strength sequence of the detection signal includes: extracting, from the signal strength sequence, a first sequence fragment corresponding to a detection signal transmitted by a detection signal source disposed at a vehicle and a second sequence fragment corresponding to a detection signal transmitted by a detection signal source disposed at a stop; determining a travel time range and a used vehicle of the user according to a signal strength value and time stamp information that correspond to the first sequence fragment, and determining a travel departure stop, a vehicle waiting time length, and a travel destination stop of the user according to a signal strength value and time stamp information that correspond to the second sequence fragment and the travel time range; and using the travel time range, the used vehicle, the travel departure stop, the vehicle waiting time length, and the travel destination stop of the user as the travel information of the user.

In some embodiments, when the computer-executable instructions stored in the storage medium are executed by the processor, the determining a travel time range and a used vehicle of the user according to a signal strength value and time stamp information that correspond to the first sequence fragment includes: extracting, from the first sequence fragment according to the signal strength value and the time stamp information that correspond to the first sequence fragment, a first target fragment with duration greater than a first time length threshold and with a maximum signal strength value greater than or equal to a first strength threshold; and determining a time range corresponding to the first target fragment as the travel time range of the user, and determining a vehicle corresponding to the first target fragment as the used vehicle of the user.

In some embodiments, when the computer-executable instructions stored in the storage medium are executed by the processor, the determining a travel departure stop, a vehicle waiting time length, and a travel destination stop of the user according to a signal strength value and time stamp information that correspond to the second sequence fragment and the travel time range includes: extracting, from the second sequence fragment according to the signal strength value and the time stamp information that correspond to the second sequence fragment, a second target fragment with an end time and with a maximum signal strength value greater than or equal to a second strength threshold, where a time length between the end time and a start time of the travel time range is less than a second time length threshold, determining a stop corresponding to the second target fragment as the travel departure stop of the user, and determining duration of the second target fragment as the vehicle waiting time length of the user; and extracting, from the second sequence fragment according to the signal strength value and the time stamp information that correspond to the second sequence fragment, a third target fragment with a start time and with a maximum signal strength value greater than or equal to a third strength threshold, where a time length between the start time and an end time of the travel time range is less than a third time length threshold, and determining a stop corresponding to the third target fragment as the travel destination stop of the user.

In some embodiments, when the computer-executable instructions stored in the storage medium are executed by the processor, before the determining a travel time range and a used vehicle of the user according to a signal strength value and time stamp information that correspond to the first sequence fragment, and determining a travel departure stop, a vehicle waiting time length, and a travel destination stop of the user according to a signal strength value and time stamp information that correspond to the second sequence fragment and the travel time range, the method further includes: separately performing filtering processing on the first sequence fragment and the second sequence fragment; and the determining a travel time range and a used vehicle of the user according to a signal strength value and time stamp information that correspond to the first sequence fragment, and determining a travel departure stop, a vehicle waiting time length, and a travel destination stop of the user according to a signal strength value and time stamp information that correspond to the second sequence fragment and the travel time range includes: determining the travel time range and the used vehicle of the user according to the signal strength value and the time stamp information that correspond to the first sequence fragment on which the filtering processing is performed, and determining the travel departure stop, the vehicle waiting time length, and the travel destination stop of the user according to the signal strength value and the time stamp information that correspond to the second sequence fragment on which the filtering processing is performed and the travel time range.

In some embodiments, when the computer-executable instructions stored in the storage medium are executed by the processor, the separately performing filtering processing on the first sequence fragment and the second sequence fragment includes: dividing, based on a set time length, the first sequence fragment into a plurality of first sub-fragments according to the time stamp information that corresponds to the first sequence fragment, and using, in the first sub-fragments, an average value or a median value of signal strength values of the first sub-fragments as a final signal strength value of the first sub-fragments; and dividing, based on the set time length, the second sequence fragment into a plurality of second sub-fragments according to the time stamp information that corresponds to the second sequence fragment, and using, in the second sub-fragments, an average value or a median value of signal strength values of the second sub-fragments as a final signal strength value of the second sub-fragments.

In some embodiments, when the computer-executable instructions stored in the storage medium are executed by the processor, the method further includes: predicting a next departure time of the user according to the travel information of the user; and controlling the user terminal to load a ride module before the next departure time, where the ride module is used by the user to take a usable vehicle in the travel route.

In this embodiment of the present specification, a vehicle scheduling strategy corresponding to a travel route can be determined based on a signal strength sequence of a detection signal detected by scanning the travel route by a user terminal, thereby accurately determining a vehicle scheduling strategy in the travel route.

The storage medium in this embodiment of the present specification can implement the processes of the foregoing method for determining a vehicle scheduling strategy, and in particular, the processes of the method for determining a vehicle scheduling strategy in FIG. 2 to FIG. 4. In addition, the apparatus can achieve the same functions and effects. Details are not described herein again.

In another specific embodiment, the storage medium may be a USB flash drive, an optical disc, a hard disk or the like. The computer-executable instructions stored in the storage medium, when executed by a processor, can implement the following operations: obtaining travel information of a plurality of users, where the travel information is determined according to signal strength sequences of a detection signal detected by scanning a travel route by user terminals, and the detection signal is transmitted by a detection signal source disposed at a preset location in the travel route; and determining a vehicle scheduling strategy corresponding to the travel route according to the travel information of the plurality of users.

In some embodiments, when the computer-executable instructions stored in the storage medium are executed by the processor, the determining a vehicle scheduling strategy corresponding to the travel route according to the travel information of the plurality of users includes: determining vehicle scheduling reference information according to the travel information of the plurality of users, where the vehicle scheduling reference information includes at least one piece of passenger quantity information of travel vehicles in travel routes in the travel route, waiting passenger quantity information of stops in the travel routes in the travel route, and vehicle waiting time length information of the stops in the travel routes in the travel route; and determining the vehicle scheduling strategy corresponding to the travel routes according to the vehicle scheduling reference information.

In some embodiments, when the computer-executable instructions stored in the storage medium are executed by the processor, the method further includes: predicting, for any user, a next departure time of the user according to the travel information of the user; and sending a ride module loading instruction to a user terminal corresponding to the user before the next departure time, to control the user terminal corresponding to the user to load a ride module, where the ride module is used by the user to take a usable vehicle in the travel route.

In this embodiment of the present specification, a vehicle scheduling strategy corresponding to a travel route can be determined according to travel information of a plurality of users, thereby accurately determining a vehicle scheduling strategy in the travel route.

The storage medium in this embodiment of the present specification can implement the processes of the foregoing method for determining a vehicle scheduling strategy, and in particular, the processes of the method for determining a vehicle scheduling strategy in FIG. 5. In addition, the apparatus can achieve the same functions and effects. Details are not described herein again.

In another specific embodiment, the storage medium may be a USB flash drive, an optical disc, a hard disk or the like. The computer-executable instructions stored in the storage medium, when executed by a processor, can implement the following operations: obtaining signal strength sequences of a detection signal detected by scanning a travel route by a plurality of user terminals, where the detection signal is transmitted by a detection signal source disposed at a preset location in the travel route; determining travel information of a plurality of users according to the signal strength sequences of the detection signal; and determining a vehicle scheduling strategy corresponding to the travel route according to the travel information of the plurality of users.

In some embodiments, when the computer-executable instructions stored in the storage medium are executed by the processor, the preset location is a vehicle or a stop, and the determining travel information of a plurality of users according to the signal strength sequences of the detection signal includes: for the signal strength sequence detected by any user terminal through scanning, extracting, from the signal strength sequence, a first sequence fragment corresponding to a detection signal transmitted by a detection signal source disposed at a vehicle and a second sequence fragment corresponding to a detection signal transmitted by a detection signal source disposed at a stop; determining a travel time range and a used vehicle of a user of the user terminal according to a signal strength value and time stamp information that correspond to the first sequence fragment; determining a travel departure stop, a vehicle waiting time length, and a travel destination stop of the user of the user terminal according to a signal strength value and time stamp information that correspond to the second sequence fragment and the travel time range; and using the travel time range, the used vehicle, the travel departure stop, the vehicle waiting time length, and the travel destination stop of the user of the user terminal as the travel information of the user of the user terminal.

In some embodiments, when the computer-executable instructions stored in the storage medium are executed by the processor, the determining a travel time range and a used vehicle of the user of the user terminal according to a signal strength value and time stamp information that correspond to the first sequence fragment includes: extracting, from the first sequence fragment according to the signal strength value and the time stamp information that correspond to the first sequence fragment, a first target fragment with duration greater than a first time length threshold and with a maximum signal strength value greater than or equal to a first strength threshold; and determining a time range corresponding to the first target fragment as the travel time range of the user of the user terminal, and determining a vehicle corresponding to the first target fragment as the used vehicle of the user of the user terminal.

In some embodiments, when the computer-executable instructions stored in the storage medium are executed by the processor, the determining a travel departure stop, a vehicle waiting time length, and a travel destination stop of the user of the user terminal according to a signal strength value and time stamp information that correspond to the second sequence fragment and the travel time range includes: extracting, from the second sequence fragment according to the signal strength value and the time stamp information that correspond to the second sequence fragment, a second target fragment with an end time and with a maximum signal strength value greater than or equal to a second strength threshold, where a time length between the end time and a start time of the travel time range is less than a second time length threshold, determining a stop corresponding to the second target fragment as the travel departure stop of the user of the user terminal, and determining duration of the second target fragment as the vehicle waiting time length of the user of the user terminal; and extracting, from the second sequence fragment according to the signal strength value and the time stamp information that correspond to the second sequence fragment, a third target fragment with a start time and with a maximum signal strength value greater than or equal to a third strength threshold, where a time length between the start time and an end time of the travel time range is less than a third time length threshold, and determining a stop corresponding to the third target fragment as the travel destination stop of the user of the user terminal.

In some embodiments, when the computer-executable instructions stored in the storage medium are executed by the processor, the determining a vehicle scheduling strategy corresponding to the travel route according to the travel information of the plurality of users includes: determining vehicle scheduling reference information according to the travel information of the plurality of users, where the vehicle scheduling reference information includes at least one piece of passenger quantity information of travel vehicles in travel routes in the travel route, waiting passenger quantity information of stops in the travel routes in the travel route, and vehicle waiting time length information of the stops in the travel routes in the travel route; and determining the vehicle scheduling strategy corresponding to the travel routes according to the vehicle scheduling reference information.

In some embodiments, when the computer-executable instructions stored in the storage medium are executed by the processor, the method further includes: predicting, for any user, a next departure time of the user according to the travel information of the user; and sending a ride module loading instruction to a user terminal corresponding to the user before the next departure time, to control the user terminal corresponding to the user to load a ride module, where the ride module is used by the user to take a usable vehicle in the travel route.

In this embodiment of the present specification, a vehicle scheduling strategy corresponding to a travel route can be determined according to travel information of a plurality of users, thereby accurately determining a vehicle scheduling strategy in the travel route.

The storage medium in this embodiment of the present specification can implement the processes of the foregoing method for determining a vehicle scheduling strategy, and in particular, the processes of the method for determining a vehicle scheduling strategy in FIG. 6. In addition, the apparatus can achieve the same functions and effects. Details are not described herein again.

In the 1990s, improvements of a technology can be clearly distinguished between hardware improvements (for example, improvements to a circuit structure such as a diode, a transistor, a switch, etc.) and software improvements (improvements to a method procedure). However, with the development of technology, improvements of many method procedures can be considered as direct improvements of hardware circuit structures. Designers almost all program an improved method procedure to a hardware circuit, to obtain a corresponding hardware circuit structure. Therefore, it does not mean that the improvement of a method procedure cannot be implemented by using a hardware entity module. For example, a programmable logic device (PLD) such as a field programmable gate array (FPGA) is a type of integrated circuit whose logic function is determined by a user by programming the device. The designers perform voluntary programming to "integrate" a digital system into a single PLD without requiring a chip manufacturer to design and prepare a dedicated integrated circuit chip. Moreover, nowadays, instead of manually making integrated circuit chips, this programming is mostly implemented by using "logic compiler" software, which is similar to the software compiler used in program development and writing. The original code is written in a specific programming language before compiling, and this language is referred to as a hardware description language (HDL). There are various kinds of HDLs, for example, advanced boolean expression language (ABEL), altera hardware description language (AHDL), Confluence, cornell university programming language (CUPL), HDCal, Java hardware description language (JHDL), Lava, Lola, MyHDL, PALASM, Ruby hardware description language (RHDL), and the like. Currently, the most commonly used HDLs are very-high-speed integrated circuit hardware description language (VHDL) and Verilog. A person skilled in the art should also understand that as long as a method procedure is logically programmed and then programmed to an integrated circuit by using the foregoing hardware description languages, a hardware circuit that implements the logical method procedure can be easily obtained.

The controller can be implemented in any suitable manner, for example, the controller can take the form of, for example, a microprocessor or processor and a computer-readable medium storing computer-readable program code (for example, software or firmware) executable by the processor, a logic gate, a switch, an application-specific integrated circuit (ASIC), a programmable logic controller and an embedded microcontroller. Examples of the controller include, but are not limited to, the following microcontrollers: ARC 625D, Atmel AT91SAM, Microchip PIC18F26K20 and Silicone Labs C8051F320. The memory controller can also be implemented as part of the memory control logic. A person skilled in the art will also appreciate that, in addition to implementing the controller in the form of pure computer-readable program code, it is also possible to implement the controller in the form of a logic gate, switch, application-specific integrated circuit, programmable logic controller, and embedded microcontroller and other forms to achieve the same function. Such a controller can thus be considered as a hardware component and apparatuses included therein for implementing various functions can also be considered as structures inside the hardware component. Alternatively, apparatuses configured to implement various functions can be considered as both software modules implementing the method and structures inside the hardware component.

The system, the apparatus, the module or the unit described in the foregoing embodiments can be specifically implemented by a computer chip or an entity or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email device, a game console, a tablet computer, a wearable device, or a combination of any of these devices.

For ease of description, when the apparatus is described, the apparatus is divided into units according to functions, which are separately described. Certainly, in implementation of the present specification, the function of the units may be implemented in a same piece of or multiple pieces of software and/or hardware.

A person skilled in the art should understand that the embodiments of the present specification may be provided as a method, a system, or a computer program product. Therefore, the present specification may use a form of a hardware-only embodiment, a software-only embodiment, or an embodiment combining software and hardware. In addition, the present specification may use a form of a computer program product implemented on one or more computer available storage media (including but not limited to a disk memory, a CD-ROM, an optical memory, and the like) including computer available program code.

The present specification is described with reference to flowcharts and/or block diagrams of the method, the device (system), and the computer program product in the embodiments of the present specification. It should be understood that computer program instructions can implement each procedure and/or block in the flowcharts and/or block diagrams and a combination of procedures and/or blocks in the flowcharts and/or block diagrams. These computer program instructions may be provided to a general-purpose computer, a special-purpose computer, an embedded processor, or a processor of another programmable data processing device to generate a machine, so that an apparatus configured to implement functions specified in one or more procedures in the flowcharts and/or one or more blocks in the block diagrams is generated by using instructions executed by the general-purpose computer or the processor of another programmable data processing device.

These computer program instructions may also be stored in a computer readable memory that can guide a computer or another programmable data processing device to work in a specific manner, so that the instructions stored in the computer readable memory generate a product including an instruction apparatus, where the instruction apparatus implements functions specified in one or more procedures in the flowcharts and/or one or more blocks in the block diagrams.

These computer program instructions may also be loaded into a computer or another programmable data processing device, so that a series of operation steps are performed on the computer or another programmable data processing device to generate processing implemented by a computer, and instructions executed on the computer or another programmable data processing device provide steps for implementing functions specified in one or more procedures in the flowcharts and/or one or more blocks in the block diagrams.

In a typical configuration, the computer device includes one or more processors (CPUs), an input/output interface, a network interface, and a memory.

The memory may include, among computer readable media, a non-persistent memory such as a random access memory (RAM) and/or a non-volatile memory such as a read-only memory (ROM) or a flash memory (flash RAM). The memory is an example of the computer readable medium.

The computer readable medium includes a persistent medium and a non-persistent medium, a removable medium and a non-removable medium, which may implement storage of information by using any method or technology. The information may be a computer readable instruction, a data structure, a module of a program or other data. Examples of computer storage media include but are not limited to a phase change memory (PRAM), a static random access memory (SRAM), a dynamic random access memory (DRAM), other type of random access memory (RAM), a read-only memory (ROM), an electrically erasable programmable read-only memory (EEPROM), a flash memory or other memory technology, a compact disc read-only memory (CD-ROM), a digital versatile disc (DVD) or other optical storage, a cassette magnetic tape, tape and disk storage or other magnetic storage device or any other non-transmission media that may be configured to store information that a computing device can access. Based on the definition herein, the computer-readable medium does not include transitory computer readable media (transitory media), such as a modulated data signal and a carrier.

It should also be noted that the terms "include", "comprise" and any other variants mean to cover the non-exclusive inclusion. Thereby, the process, method, article, or device which include a series of elements not only include those elements, but also include other elements which are not clearly listed, or include the inherent elements of the process, method, article and device. Without further limitation, the element defined by a phrase "include one" does not exclude other same elements in the process, method, article or device which include the element.

A person skilled in the art should understand that the embodiments of the present specification may be provided as a method, a system, or a computer program product. Therefore, the present specification may use a form of hardware only embodiments, software only embodiments, or embodiments with a combination of software and hardware. In addition, the present specification may use a form of a computer program product implemented on one or more computer available storage media (including but not limited to a disk memory, a CD-ROM, an optical memory, and the like) including computer available program code.

The present specification can be described in the general context of computer executable instructions executed by a computer, for example, a program module. Generally, the program module includes a routine, a program, an object, a component, a data structure, and the like for executing a particular task or implementing a particular abstract data type. The present specification can also be practiced in a distributed computing environment in which tasks are performed by remote processing devices that are connected through a communication network. In a distributed computing environment, the program module may be located in both local and remote computer storage media including storage devices.

The embodiments of the present specification are all described in a progressive manner, for same or similar parts in the embodiments, refer to these embodiments, and descriptions of each embodiment focus on a difference from other embodiments. Especially, a system embodiment is basically similar to a method embodiment, and therefore is described briefly; for related parts, reference may be made to partial descriptions in the method embodiment.

The foregoing descriptions are merely embodiments of the present specification and are not intended to limit the present specification. For a person skilled in the art, various modifications and variations can be made to the present specification. Any modification, equivalent replacement, or improvement made without departing from the spirit and principle of the present specification shall fall within the scope of the claims of the present specification.

What is claimed is:

1. A method comprising:
   obtaining a signal strength sequence of signals detected by a user terminal during a travel route, wherein the detected signals are originated from signal sources disposed at different locations in the travel route, wherein the different locations include one or more vehicles or one or more stops;
   extracting, from the signal strength sequence, a first sequence fragment corresponding to a signal transmitted by a signal source disposed at a vehicle;
   determining a travel time duration of a user riding on the vehicle according to a signal strength value and time stamp information of the first sequence fragment;
   extracting, from the signal strength sequence, a second sequence fragment corresponding to a signal transmitted by a signal source disposed at a stop;
   determining a travel departure stop, a waiting time duration the user spends until the vehicle arrives at the travel departure stop, and a travel destination stop of the user according to a signal strength value and time stamp information of the second sequence fragment, by:
      extracting, from the second sequence fragment according to the signal strength value and the time stamp information of the second sequence fragment, a first target fragment having an end time and a maximum signal strength value greater than or equal to a first signal strength threshold, wherein a time duration between the end time of the first target fragment and a start time of the travel time duration is less than a first time duration threshold;
      determining a stop corresponding to the first target fragment as the travel departure stop of the user;
      determining a duration of the first target fragment as the waiting time duration of the user;
      extracting, from the second sequence fragment according to the signal strength value and the time stamp information of the second sequence fragment, a second target fragment having a start time and a maximum signal strength value greater than or equal to a second signal strength threshold, wherein a time duration between the start time of the second target fragment and an end time of the travel time duration is less than a second time duration threshold; and
      determining a stop corresponding to the second target fragment as the travel destination stop of the user.

2. The method according to claim 1, wherein the determining a travel time duration of a user riding on the vehicle according to a signal strength value and time stamp information of the first sequence fragment comprises:
   extracting, from the first sequence fragment according to the signal strength value and the time stamp information of the first sequence fragment, a third target fragment having a duration greater than a third time duration threshold and having a maximum signal strength value greater than or equal to a third signal strength threshold;
   determining a time duration of the third target fragment as the travel time duration of the user; and
   determining a vehicle corresponding to the third target fragment as a vehicle used by the user, wherein the third target fragment includes an identification of the vehicle.

3. The method according to claim 1, wherein before the determining a travel time duration of a user riding on a vehicle according to a signal strength value and time stamp information of the first sequence fragment, the method further comprises:
   filtering the first sequence fragment; and
   wherein the determining a travel time duration of the user riding on a vehicle according to a signal strength value and time stamp information of the first sequence fragment, comprises:
   determining the travel time duration according to a signal strength value and time stamp information of the filtered first sequence fragment.

4. The method according to claim 3, wherein the filtering the first sequence fragment comprises:
   dividing, based on a set time duration, the first sequence fragment into a plurality of first sub-fragments according to the time stamp information of the first sequence fragment, and using, in the first sub-fragments, an average value or a median value of signal strength values of the first sub-fragments as a final signal strength value of the first sub-fragments.

5. The method according to claim 1, wherein before the determining a travel departure stop, a waiting time duration the user spends until the vehicle arrives at the travel departure stop, and a travel destination stop of the user according to a signal strength value and time stamp information of the second sequence fragment, the method further comprises:
   filtering the second sequence fragment; and
   wherein the determining a travel departure stop, a waiting time duration the user spends until the vehicle arrives at the travel departure stop, and a travel destination stop of the user according to a signal strength value and time stamp information of the second sequence fragment comprises:
   determining the travel departure stop, the waiting time duration, and the travel destination stop of the user according to a signal strength value and time stamp information of the filtered second sequence fragment.

6. The method according to claim 5, wherein the filtering the second sequence fragment comprises:
   dividing, based on a set time duration, the second sequence fragment into a plurality of second sub-fragments according to the time stamp information of the second sequence fragment, and using, in the second sub-fragments, an average value or a median value of signal strength values of the second sub-fragments as a final signal strength value of the second sub-fragments.

7. The method according to claim 1, further comprising:
   predicting a next departure time of the user according to travel information of the user; and
   controlling the user terminal to load a ride module before the next departure time, wherein the ride module is used by the user to take a vehicle in the travel route.

8. An apparatus comprising:
one or more processors, and a memory storing instructions executable by the one or more processors to causes the one or more processors to perform operations comprising:
obtaining a signal strength sequence of signals detected by a user terminal during a travel route, wherein the detected signals are originated from signal sources disposed at different locations in the travel route, wherein the different locations include one or more vehicles or one or more stops;
extracting, from the signal strength sequence, a first sequence fragment corresponding to a signal transmitted by a signal source disposed at a vehicle;
determining a travel time duration of a user riding on the vehicle according to a signal strength value and time stamp information of the first sequence fragment;
extracting, from the signal strength sequence, a second sequence fragment corresponding to a signal transmitted by a signal source disposed at a stop;
determining a travel departure stop, a waiting time duration the user spends until the vehicle arrives at the travel departure stop, and a travel destination stop of the user according to a signal strength value and time stamp information of the second sequence fragment, by:
extracting, from the second sequence fragment according to the signal strength value and the time stamp information of the second sequence fragment, a first target fragment having an end time and a maximum signal strength value greater than or equal to a first signal strength threshold, wherein a time duration between the end time of the first target fragment and a start time of the travel time duration is less than a first time duration threshold;
determining a stop corresponding to the first target fragment as the travel departure stop of the user;
determining a duration of the first target fragment as the waiting time duration of the user;
extracting, from the second sequence fragment according to the signal strength value and the time stamp information of the second sequence fragment, a second target fragment having a start time and a maximum signal strength value greater than or equal to a second signal strength threshold, wherein a time duration between the start time of the second target fragment and an end time of the travel time duration is less than a second time duration threshold; and
determining a stop corresponding to the second target fragment as the travel destination stop of the user.

9. The apparatus according to claim 8, wherein the determining a travel time duration of a user riding on the vehicle according to a signal strength value and time stamp information of the first sequence fragment comprises:
extracting, from the first sequence fragment according to the signal strength value and the time stamp information of the first sequence fragment, a third target fragment having a duration greater than a third time duration threshold and having a maximum signal strength value greater than or equal to a third signal strength threshold;
determining a time duration of the third target fragment as the travel time duration of the user; and
determining a vehicle corresponding to the third target fragment as a vehicle used by the user, wherein the third target fragment includes an identification of the vehicle.

10. The apparatus according to claim 8, wherein before the determining a travel time duration of a user riding on a vehicle according to a signal strength value and time stamp information of the first sequence fragment, the operations further comprise:
filtering the first sequence fragment; and
wherein the determining a travel time duration of the user riding on a vehicle according to a signal strength value and time stamp information of the first sequence fragment, comprises:
determining the travel time duration according to a signal strength value and time stamp information of the filtered first sequence fragment.

11. The apparatus according to claim 10, wherein the filtering the first sequence fragment comprises:
dividing, based on a set time duration, the first sequence fragment into a plurality of first sub-fragments according to the time stamp information of the first sequence fragment, and using, in the first sub-fragments, an average value or a median value of signal strength values of the first sub-fragments as a final signal strength value of the first sub-fragments.

12. The apparatus according to claim 8, wherein before the determining a travel departure stop, a waiting time duration the user spends until the vehicle arrives at the travel departure stop, and a travel destination stop of the user according to a signal strength value and time stamp information of the second sequence fragment, the operations further comprise:
filtering the second sequence fragment; and
wherein the determining a travel departure stop, a waiting time duration the user spends until the vehicle arrives at the travel departure stop, and a travel destination stop of the user according to a signal strength value and time stamp information of the second sequence fragment comprises:
determining the travel departure stop, the waiting time duration, and the travel destination stop of the user according to a signal strength value and time stamp information of the filtered second sequence fragment.

13. The apparatus according to claim 12, wherein the filtering the second sequence fragment comprises:
dividing, based on a set time duration, the second sequence fragment into a plurality of second sub-fragments according to the time stamp information of the second sequence fragment, and using, in the second sub-fragments, an average value or a median value of signal strength values of the second sub-fragments as a final signal strength value of the second sub-fragments.

14. The apparatus according to claim 8, wherein the operations further comprise:
predicting a next departure time of the user according to travel information of the user; and
controlling the user terminal to load a ride module before the next departure time, wherein the ride module is used by the user to take a vehicle in the travel route.

15. One or more non-transitory computer-readable storage media configured with instructions executable by one or more processors to cause the one or more processors to perform operations comprising:
obtaining a signal strength sequence of signals detected by a user terminal during a travel route, wherein the detected signals are originated from signal sources disposed at different locations in the travel route, wherein the different locations include one or more vehicles or one or more stops;

extracting, from the signal strength sequence, a first sequence fragment corresponding to a signal transmitted by a signal source disposed at a vehicle;

determining a travel time duration of a user riding on the vehicle according to a signal strength value and time stamp information of the first sequence fragment;

extracting, from the signal strength sequence, a second sequence fragment corresponding to a signal transmitted by a signal source disposed at a stop;

determining a travel departure stop, a waiting time duration the user spends until the vehicle arrives at the travel departure stop, and a travel destination stop of the user according to a signal strength value and time stamp information of the second sequence fragment, by:

extracting, from the second sequence fragment according to the signal strength value and the time stamp information of the second sequence fragment, a first target fragment having an end time and a maximum signal strength value greater than or equal to a first signal strength threshold, wherein a time duration between the end time of the first target fragment and a start time of the travel time duration is less than a first time duration threshold;

determining a stop corresponding to the first target fragment as the travel departure stop of the user;

determining a duration of the first target fragment as the waiting time duration of the user;

extracting, from the second sequence fragment according to the signal strength value and the time stamp information of the second sequence fragment, a second target fragment having a start time and a maximum signal strength value greater than or equal to a second signal strength threshold, wherein a time duration between the start time of the second target fragment and an end time of the travel time duration is less than a second time duration threshold; and determining a stop corresponding to the second target fragment as the travel destination stop of the user.

16. The one or more non-transitory computer-readable storage media according to claim 15, wherein the determining a travel time duration of a user riding on the vehicle according to a signal strength value and time stamp information of the first sequence fragment comprises:

extracting, from the first sequence fragment according to the signal strength value and the time stamp information of the first sequence fragment, a third target fragment having a duration greater than a third time duration threshold and having a maximum signal strength value greater than or equal to a third signal strength threshold;

determining a time duration of the third target fragment as the travel time duration of the user; and determining a vehicle corresponding to the third target fragment as a vehicle used by the user, wherein the third target fragment includes an identification of the vehicle.

17. The one or more non-transitory computer-readable storage media according to claim 15, wherein the operations further comprise:

predicting a next departure time of the user according to travel information of the user; and controlling the user terminal to load a ride module before the next departure time, wherein the ride module is used by the user to take a vehicle in the travel route.

18. The one or more non-transitory computer-readable storage media according to claim 15, wherein before the determining a travel time duration of a user riding on a vehicle according to a signal strength value and time stamp information of the first sequence fragment, the method further comprises:

filtering the first sequence fragment; and wherein the determining a travel time duration of the user riding on a vehicle according to a signal strength value and time stamp information of the first sequence fragment, comprises:

determining the travel time duration according to a signal strength value and time stamp information of the filtered first sequence fragment.

19. The one or more non-transitory computer-readable storage media according to claim 18, wherein the filtering the first sequence fragment comprises:

dividing, based on a set time duration, the first sequence fragment into a plurality of first sub-fragments according to the time stamp information of the first sequence fragment, and using, in the first sub-fragments, an average value or a median value of signal strength values of the first sub-fragments as a final signal strength value of the first sub-fragments.

20. The one or more non-transitory computer-readable storage media according to claim 15, wherein before the determining a travel departure stop, a waiting time duration the user spends until the vehicle arrives at the travel departure stop, and a travel destination stop of the user according to a signal strength value and time stamp information of the second sequence fragment, the method further comprises:

filtering the second sequence fragment; and wherein the determining a travel departure stop, a waiting time duration the user spends until the vehicle arrives at the travel departure stop, and a travel destination stop of the user according to a signal strength value and time stamp information of the second sequence fragment comprises:

determining the travel departure stop, the waiting time duration, and the travel destination stop of the user according to a signal strength value and time stamp information of the filtered second sequence fragment.

* * * * *